(12) United States Patent
Kohli

(10) Patent No.: US 12,131,395 B2
(45) Date of Patent: *Oct. 29, 2024

(54) ITEM SELECTION FOR FAST DELIVERIES

(71) Applicant: DOORDASH, INC., San Francisco, CA (US)

(72) Inventor: Avlok Kohli, San Francisco, CA (US)

(73) Assignee: DOORDASH, INC., San Francisco, CA (US)

( * ) Notice: Subject to any disclaimer, the term of this patent is extended or adjusted under 35 U.S.C. 154(b) by 234 days.

This patent is subject to a terminal disclaimer.

(21) Appl. No.: 17/319,199

(22) Filed: May 13, 2021

(65) Prior Publication Data
US 2021/0272221 A1 Sep. 2, 2021

Related U.S. Application Data

(63) Continuation of application No. 16/436,997, filed on Jun. 11, 2019, now Pat. No. 11,037,254, which is a
(Continued)

(51) Int. Cl.
*G06Q 50/12* (2012.01)
*G06Q 10/0832* (2023.01)
(Continued)

(52) U.S. Cl.
CPC ......... *G06Q 50/12* (2013.01); *G06Q 10/0832* (2013.01); *G06Q 10/0835* (2013.01); *G06Q 30/0635* (2013.01)

(58) Field of Classification Search
None
See application file for complete search history.

(56) References Cited

U.S. PATENT DOCUMENTS

| 5,751,245 A | 5/1998 | Janky et al. |
| 6,026,375 A | 2/2000 | Hall et al. |

(Continued)

FOREIGN PATENT DOCUMENTS

CN 103377437 A 10/2013

OTHER PUBLICATIONS

Horn, L., "Groupon Now Provides Instant Location-Based Deals," PC Magazine Online, dated May 11, 2011, ProQuest Dialog, Retrieved from the Internet URL: http://search.proquest.com/professional/docview/1092618010?accountid=161862, on Nov. 2, 2015, pp. 1-2.
(Continued)

*Primary Examiner* — Fateh M Obaid
(74) *Attorney, Agent, or Firm* — MATTINGLY & MALUR, PC

(57) ABSTRACT

In some examples, a system receives, from a courier device, an indicated geographic location of the courier device determined at least in part from a satellite positioning system receiver associated with the courier device. The system may determine an amount of an item possessed by the courier and may further determine a plurality of past delivery locations within a threshold courier travel time of the indicated geographic location of the courier device. In addition, the system may determine a plurality of buyer devices associated with the plurality of past delivery locations, and may send, to the plurality of buyer devices, respective electronic communications indicting that the item is available for delivery from the courier located within the threshold courier travel time of a respective buyer location.

20 Claims, 12 Drawing Sheets

Related U.S. Application Data continuation of application No. 14/838,446, filed on Aug. 28, 2015, now Pat. No. 10,319,053.

(51) Int. Cl.
*G06Q 10/0835* (2023.01)
*G06Q 30/0601* (2023.01)

(56) References Cited

U.S. PATENT DOCUMENTS

| | | | |
|---|---|---|---|
| 6,206,750 | B1 | 3/2001 | Barad et al. |
| 6,269,343 | B1 | 7/2001 | Pallakoff |
| 6,871,184 | B1* | 3/2005 | Liberman ............... G07F 7/00 |
| | | | 705/15 |
| 7,181,419 | B1 | 2/2007 | Mesaros |
| 8,458,044 | B2 | 6/2013 | Blair et al. |
| 8,504,435 | B2 | 8/2013 | Charles |
| 9,269,103 | B1 | 2/2016 | Kumar et al. |
| 9,466,045 | B1 | 10/2016 | Kumar |
| 9,639,908 | B1* | 5/2017 | Reiss ................... G01S 5/0294 |
| 9,679,489 | B2 | 6/2017 | Lambert et al. |
| 9,767,471 | B1 | 9/2017 | Perrone et al. |
| 10,043,149 | B1* | 8/2018 | Iacono ................... G07F 17/40 |
| 10,176,448 | B1* | 1/2019 | Rhodes ................... G01S 19/14 |
| 10,262,292 | B1* | 4/2019 | Kumar .................. G06Q 50/12 |
| 10,319,053 | B1 | 6/2019 | Kohli |
| 2002/0077937 | A1 | 6/2002 | Lyons et al. |
| 2003/0225679 | A1 | 12/2003 | Tenorio |
| 2006/0136237 | A1* | 6/2006 | Spiegel ............. G06Q 10/0835 |
| | | | 705/13 |
| 2006/0206395 | A1 | 9/2006 | Vallabh |
| 2006/0235754 | A1 | 10/2006 | Walker et al. |
| 2007/0043651 | A1 | 2/2007 | Xiao et al. |
| 2008/0052163 | A1 | 2/2008 | Koh |
| 2008/0140577 | A1 | 6/2008 | Rahman et al. |
| 2009/0187488 | A1 | 7/2009 | Shamilian |
| 2010/0076854 | A1* | 3/2010 | Martucci ............... G06Q 30/04 |
| | | | 705/26.1 |
| 2011/0202390 | A1 | 8/2011 | Reese et al. |
| 2011/0295722 | A1 | 12/2011 | Reisman |
| 2011/0320362 | A1 | 12/2011 | Van Horn et al. |
| 2012/0036028 | A1 | 2/2012 | Webb |
| 2012/0143656 | A1 | 6/2012 | Murphy |
| 2012/0197722 | A1 | 8/2012 | Mesaros |
| 2012/0203619 | A1 | 8/2012 | Lutnick et al. |
| 2012/0203708 | A1 | 8/2012 | Psota et al. |
| 2012/0215657 | A1 | 8/2012 | Compton et al. |
| 2013/0006747 | A1 | 1/2013 | Wu |
| 2013/0018711 | A1 | 1/2013 | Winslade et al. |
| 2013/0046605 | A1 | 2/2013 | Baron et al. |
| 2013/0054323 | A1 | 2/2013 | Charles |
| 2013/0132179 | A1 | 5/2013 | Wu et al. |
| 2013/0132220 | A1 | 5/2013 | Baum |
| 2013/0211944 | A1 | 8/2013 | Momin et al. |
| 2013/0246207 | A1 | 9/2013 | Novak et al. |
| 2013/0268369 | A1 | 10/2013 | McMaster et al. |
| 2013/0290172 | A1 | 10/2013 | Mashinsky |
| 2013/0317940 | A1 | 11/2013 | Fitz |
| 2013/0346249 | A1* | 12/2013 | Li .......................... G06F 16/951 |
| | | | 705/26.61 |
| 2014/0011522 | A1 | 1/2014 | Lin et al. |
| 2014/0089135 | A1 | 3/2014 | Linh et al. |
| 2014/0156452 | A1 | 6/2014 | Lupo |
| 2014/0164126 | A1* | 6/2014 | Nicholas ................... A63F 9/24 |
| | | | 705/14.58 |
| 2014/0188650 | A1 | 7/2014 | Sun et al. |
| 2014/0188750 | A1 | 7/2014 | Seiler |
| 2014/0226487 | A1 | 8/2014 | Forssell et al. |
| 2014/0309987 | A1 | 10/2014 | Maddali et al. |
| 2014/0370167 | A1 | 12/2014 | Garden |
| 2015/0227888 | A1 | 8/2015 | Levanon et al. |
| 2015/0262121 | A1 | 9/2015 | Riel-Dalpe et al. |
| 2015/0304436 | A1 | 10/2015 | Vaccari et al. |
| 2016/0078516 | A1 | 3/2016 | Alnuwaysir et al. |
| 2018/0103804 | A1* | 4/2018 | Laub ................. G06F 13/4247 |
| 2019/0075970 | A1* | 3/2019 | Patterson ............... A47J 47/14 |
| 2019/0362302 | A1* | 11/2019 | Deemter ............... A47J 36/24 |

OTHER PUBLICATIONS

Kauffman, R.J., and Wang, B., "Bid Together, Buy Together: On the Efficacy of Group-Buying Business Models in Internet-Based Selling," Carlson School of Management, last revised on May 16, 2001, pp. 1-44.

Zheng, Y., et al., "Geolife2.0: A Location-Based Social Networking Service," 2009 Tenth International Conference on Mobile Data Management: Systems, Services and Middleware, IEEE Xplore, pp. 357-358 ( 2009 ).

Non-Final Office Action mailed May 26, 2015, for U.S. Appl. No. 14/625,680, of Kumar, A.R., et al., filed Feb. 19, 2015.

Notice of Allowance mailed Nov. 6, 2015, for U.S. Appl. No. 14/625,680, of Kumar, A.R., et al., filed Feb. 19, 2015.

Non-Final Office Action mailed Jan. 11, 2018, for U.S. Appl. No. 14/625,683, of Kumar, A.R., et al., filed Feb. 19, 2015.

Non-Final Office Action mailed Jan. 18, 2018, for U.S. Appl. No. 14/985,267, of Rhodes, M., et al., filed Dec. 30, 2015.

Non-Final Office Action mailed Jan. 26, 2018, for U.S. Appl. No. 14/838,446, of Kohli, A., filed Aug. 28, 2015.

Non-Final Office Action mailed Feb. 28, 2018, for U.S. Appl. No. 14/642,875, of Reiss, J.L., et al., filed Mar. 10, 2015.

Notice of Allowance mailed Apr. 6, 2018, for U.S. Appl. No. 14/870,886, of Iacono, J.F., et al., filed Sep. 30, 2015.

Non-Final Office Action mailed May 18, 2018, for U.S. Appl. No. 14/978,307, of Kumar, A.R., et al., filed Dec. 22, 2015.

Final Office Action mailed Aug. 28, 2018, for U.S. Appl. No. 14/642,875, of Reiss, J.L., et al., filed Mar. 10, 2015.

Notice of Allowance mailed Aug. 31, 2018, for U.S. Appl. No. 14/985,267, of Rhodes, M., et al., filed Dec. 30, 2015.

Final Office Action mailed Sep. 7, 2018, for U.S. Appl. No. 14/625,683, of Kumar, A.R., et al., filed Feb. 19, 2015.

Final Office Action mailed Sep. 21, 2018, for U.S. Appl. No. 14/838,446, of Kohli, A., filed Aug. 28, 2015.

Notice of Allowance mailed Nov. 30, 2018, for U.S. Appl. No. 14/978,307, of Kumar, A.R., et al., filed Dec. 22, 2015.

Notice of Allowance mailed Feb. 1, 2019, for U.S. Appl. No. 14/838,446, of Kohli, A., filed Aug. 28, 2015.

Non-Final Office Action mailed Feb. 21, 2019, for U.S. Appl. No. 14/642,875, of Reiss, J.L., et al., filed Mar. 10, 2015.

Non-Final Office Action mailed May 30, 2019, for U.S. Appl. No. 16/367,330, of Kumar, A.R., et al., filed Mar. 28, 2019.

Non-Final Office Action mailed Jun. 24, 2019, for U.S. Appl. No. 14/667,764, of Reiss, J.L., et al., filed Mar. 25, 2015.

Final Office Action mailed Aug. 9, 2019, for U.S. Appl. No. 14/642,875, of Reiss, J.L., et al., filed Mar. 10, 2015.

* cited by examiner

ITEM SELECTION FOR FAST DELIVERIES

CROSS-REFERENCE TO RELATED APPLICATIONS

This application is a continuation of, and claims priority to, U.S. patent application Ser. No. 16/436,997, filed Jun. 11, 2019, which is a continuation of, and claims priority to, U.S. patent application Ser. No. 14/838,446, filed Aug. 28, 2015, issued as U.S. Pat. No. 10,319,053, all of which are incorporated by reference herein.

BACKGROUND

People may sometimes be at a location where they want food, but are not able to go to a restaurant or store. Accordingly, they may want to have food delivered to them. To meet this demand, a courier may obtain food prepared by a restaurant and deliver the food to a customer at a delivery location. For example, a service may enable customers to order food items, and may arrange for couriers to deliver the food items to the customers. However, conventional food deliveries can take a relatively long time between the time at which the customer places the order and the time at which the food is delivered to the customer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
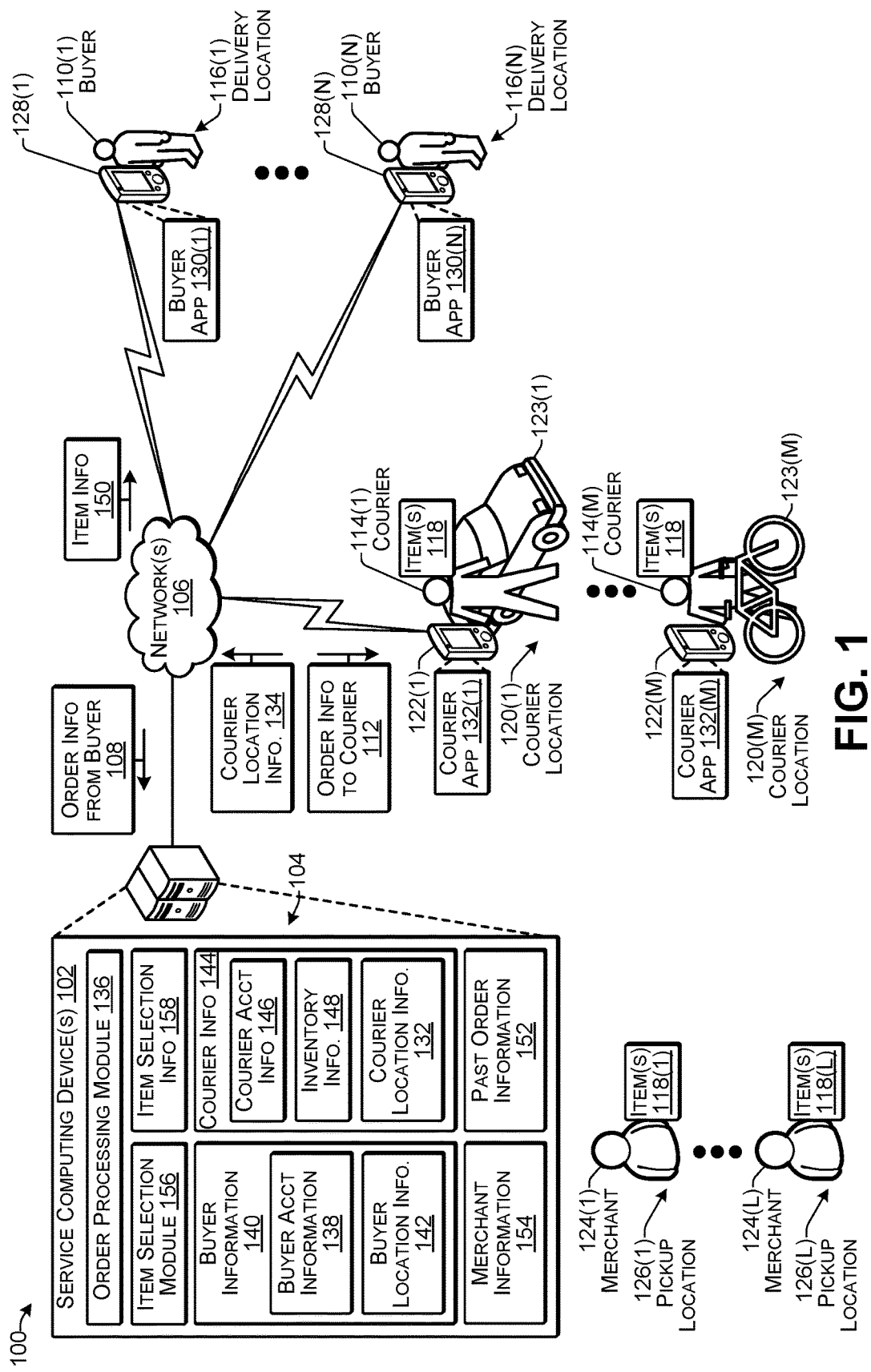
FIG. 1 illustrates an example system for a fast delivery service that utilizes couriers according to some implementations.

The technology herein provides a novel system that enables people to participate as couriers in a new type of crowdsourced service economy. The disclosed crowdsourcing systems include new types of interactive networks and apparatuses that enable non-abstract and novel innovations for fast delivery of items. With the technology herein, essentially any person with a mobile device is able to almost immediately become a courier, or cease to be a courier, in a courier network that provides services for delivery of items to buyers. Additionally, through the interaction of a plurality of computing devices, mobile devices, and location sensors that make up the system, some examples herein are able to select items for couriers to add to inventory in advance of receiving orders to enable fast delivery of the items to buyers when orders are received.

In some examples, a service provider may provide a delivery service that enables buyers to order items, such as food items, that are delivered by couriers. For instance, an item may typically be delivered to a buyer within a relatively short threshold time (e.g., 5-15 minutes) that is substantially less than conventional delivery times. In addition, implementations herein may determine from past order history and/or other past transaction information which items are likely to sell more quickly than other items so that the service may select particular items to purchase from particular merchants to offer for delivery to buyers. A quantity of an item may be picked up by each of the couriers before any orders have been placed by buyers and the items may be subsequently delivered as orders from buyers are received.

In some cases, each courier may start out with an initial inventory of certain quantities of some or all the items currently selected to be offered to buyers. For instance, each courier may have inventories of, e.g., one to two items for a lunch menu (e.g., a meat item and a salad) and one to three items for a dinner menu (e.g., a red meat dish, a poultry dish, and a vegetarian dish). Furthermore, in some examples, the service may offer different items on different days of the week to provide variety to repeat customers. Additionally, or alternatively, in some examples, the service may have a staple item that is offered every day or almost every day. For instance, the staple item may be an item that has a high menu-open-to-order (M/O) value. The M/O value may be a percentage of buyers that actually place an order compared to a total number of buyers that open the application to view a menu of the selected items. As one example, in the case of a particular brand of steak burrito, if 100 buyers open an application on their respective buyer devices to view the current items available, and out of those 100 buyers, 55 buyers place an order for the steak burrito, the M/O value for the steak burrito may be 55%.

The service may determine from past order information which items have higher M/O values than other items. For instance, the service may only regularly offer on a recurring basis items that have been determined to have an M/O value greater than a threshold M/O value, e.g., 20%. Furthermore, the number of each item that the courier initially stocks into inventory may be based, at least in part, on the M/O value for each item being stocked. In some examples, when initially determining items to offer for delivery to buyer, the service may use item sales information from a traditional delivery business and/or from brick-and-mortar merchant sales in a targeted geographic region in which the service is operating. For instance, the service may determine the best selling items from a plurality of merchants within the region that fall within specified categories and that satisfy other parameters, such as being entrées or other main dish items with sufficient spoilage resistance.

Further, the service may take on a spoilage risk by buying a quantity of an item in volume from a merchant. The item selection techniques herein may be used to reduce risk that items will spoil before the items are ordered by buyers and delivered by the couriers. For example, through analytics-driven item selection, implementations herein are able to select particular items to offer to buyers to yield a spoilage rate lower than a margin rate. For example, if the spoilage on an item is 10% then a margin greater than 10% on the item can result in a profit. In some examples, the service may determine items that are most popular in a region and that have spoilage times sufficiently long enough to allow time for a courier to maintain an inventory of the items in a transport container for a threshold length of time. Thus, proper item selection may be used to sufficiently reduce spoilage risk to enable a profit for the service.

Furthermore, in some implementations, the service may receive item information about a current oversupply of an item available from a particular merchant, and may conduct an impromptu sale the items prior to expiration of a spoilage time threshold. Accordingly, the service may sell an unsold item inventory using the techniques herein before the items spoil. For example, if a restaurant makes 100 hot dogs in anticipation of a large crowd for a sporting event, and poor weather reduces game attendance, implementations herein may determine that expected in-store sales over the next several hours will be insufficient to avoid spoilage of a substantial number of the hot dogs. Consequently, the merchant may employ the service herein to distribute the excess inventory to buyers using the couriers of the service. In some cases, this may be performed automatically and on a relatively short timescale sufficient to distribute the items before expiration of a threshold spoilage time associated with the items.

As another example, if an item already stocked by couriers is selling below a predicted quantity by a threshold amount, the service may automatically reduce the price for the item in real time to sell off the quantity of items in inventory before spoilage of the items occurs. For instance, the service may send push notifications to buyers by email or in-application notification to let the buyers know of the impromptu sale. In some cases, the service may take into consideration the M/O value associated with the item and the price to determine how much to drop the price.

In some implementations, based on the item selection techniques herein, a courier may receive a recommendation to pick up a plurality of a particular type of item from a merchant in advance of receiving any buyer orders. The courier may then travel to a recommended geographic location indicated by the service provider and wait for buyers to place orders. For instance, the service provider may determine the recommended location based on past orders received through the buyer application or based on other buyer application events, such as buyers opening the application but being outside a current delivery area.

A buyer may use a buyer application on a buyer device, such as a mobile device or other computing device, to determine the items currently available for delivery. When the buyer opens the buyer application, the service provider may determine whether a courier is within a threshold delivery travel time of the buyer's delivery location, and if so, may determine the current inventory of the courier. Based on the available inventory of the courier that is within the threshold delivery travel time of the buyer, the service provider may send item information to the buyer device. The item information received by the buyer device may cause the buyer application on the buyer device to indicate that one or more of the items in the courier's inventory are available for delivery. For example, if the courier currently has an inventory of five burritos, the buyer application may indicate to the buyer that one or more burritos are available for delivery within a threshold time based at least in part on determining the delivery travel time from the courier to the buyer's delivery location.

In the examples herein, an order may include a request submitted by a buyer (e.g., a customer) for the acquisition of a food item from a courier. The order information may be received by the service provider and may be sent by the service provider to the courier. A merchant may include a restaurant or any other business or other entity engaged in the offering of items for delivery to buyers. Actions attributed to a merchant herein may include actions performed by employees or other agents of the merchant and, thus, no distinction is made herein between merchants and their employees unless specifically discussed. In addition, a buyer may include any entity that purchases an item delivered by a courier. Buyers may include customers and potential customers. The service provider may provide payment to the merchant for the picked up items, provide payment to the courier for delivering the items, and may receive payments from the buyers for the delivered items.

For discussion purposes, some example implementations are described in the environment of a courier network for procuring and delivering selected items based on order histories. However, implementations herein are not limited to the particular examples provided, and may be extended to other service environments, other system architectures, other techniques for selecting items, and so forth, as will be apparent to those of skill in the art in light of the disclosure herein.

FIG. 1 illustrates an example system 100 for fast deliveries of items according to some implementations. The system 100 includes one or more service computing devices 102 of a service provider 104 that may receive, over one or more networks 106, order information 108 from one or more of a plurality of buyers 110(1)-110(N). The order information 108 may include information about at least one order placed by at least one of the buyers 110. Based on the order information 108 received from a particular buyer 110, the service computing device 102 may send order information 112 to a selected courier 114 of a plurality of couriers 114(1)-114(M). For instance, the selected courier 114 may be within a threshold delivery travel time of a buyer delivery location 116 of the particular buyer. As one example, when a buyer 110(1)-110(N) wishes to place an order, the service computing device 102 may first determine a respective delivery location 116(1)-116(N) of the respective buyer 110(1)-110(N) to which the order is to be delivered. Further, in addition to being within a threshold delivery travel time of the buyer's delivery location 116, the selected courier 114 may be selected based on having an inventory of one or more available items 118 that may be used to fulfil an order of the particular buyer 110.

Additionally, a respective courier location 120(1)-120(M) of each respective courier 114(1)-114(M) may be determined from a GPS receiver associated with a respective courier device 122(1)-122(M), or from other suitable location sensors. A courier 114 whose courier location 120 is within the threshold delivery travel time of the buyer's delivery location 116 may be selected for fulfilling the order. The service provider may send the order information 112 for the order to the courier device 122 of the selected courier 114. In response, the selected courier may respond by acknowledging receipt of the order information and by proceeding to the delivery location 116 specified in the order information 112. For example, the order information 112 may include at least the delivery location 116 associated with the particular buyer 110, and the number of items 118 to be delivered to the particular buyer 110. Further, at least some of the couriers 114(1)-114(M) may use vehicles 123(1)-123(M) when making deliveries. Examples of vehicles 123 may include bicycles, scooters, motorcycles, cars, trucks, skateboards, and so forth. In some cases, the type of vehicle 123 associated with a courier may be taken into consideration when determining delivery travel times.

In some examples, merchants 124(1)-124(L) may each offer one or more respective items 118(1)-118(L). Respective couriers 114 may pick up a plurality of the items 118 for delivery to buyers 110. For instance, each merchant 124(1)-124(L) may be associated with a respective pickup location 126(1)-126(L), which may typically be the merchant's place of business, at which a courier 114 may pick up a plurality of a particular item 118 from the respective merchant 124. The particular item 118 may be selected based at least in part on the item selection techniques discussed herein. The number of items 118 picked up by each courier 114 may be based at least in part on a prediction that a sufficient number of buyers 110 in a certain delivery area will place orders for the picked up items 118 before the items 118 spoil. For instance, a spoilage time may be associated with each item 118. The spoilage time may be the time between when an item 118 is ready to be picked up from the merchant 124 and when the item 118 is considered to be of degraded quality, e.g., cold, soggy, melted, wilted, oxidized, or otherwise less palatable than would be normally expected by the buyer. As discussed additionally below, the system 100 herein may include item transportation containers (not shown in FIG. 1) having insulation and temperature control devices for extending the spoilage times of particular items 118.

In the illustrated example, the service computing device 102 of the service provider 104 is able to communicate with the courier devices 122(1)-122(M) over the one or more networks 106. In addition, the buyers 110(1)-110(N) may be associated with respective buyer devices 128(1)-128(N) that may execute respective instances of buyer applications 130(1)-130(N). For example, buyers 110 may use the buyer devices 128, such as smart phones, tablet computers, wearable computing devices, laptops, desktops, or the like, and these buyer devices 128 may have installed thereon the buyer application 130. The buyer application 130 may enable the respective buyer 110 to purchase one or more of the items 118 to be delivered to the buyer 110 by one of the couriers 114. For example, the buyer application 130 may present one or more GUIs, such as for presenting information about selected items on a display of the buyer device 128 for enabling the buyer 110 to choose to order the item 118.

In some examples, the buyer application 130 may enable the buyer 110 to make a payment for an order using the buyer application 130. For instance, the service provider 104 may charge a buyer account associated with the buyer 110 for an amount corresponding to a particular order. In some cases, the buyer application 130 and the service computing device 102 may communicate with each other via one or more APIs (application programming interfaces). Additionally, or alternatively, the buyer application 130 may include a web browser, or the like, and the buyer 110 may navigate to a website associated with the service provider 104. In this case, the buyer 110 may use the website associated with the service provider 104 to place an order, and the website may provide at least some of the functionality attributed to the buyer application 130 herein.

In addition, the couriers 114(1)-114(M) may be associated with the respective courier devices 122(1)-122(M) that may each execute respective instances of courier applications 132(1)-132(M). For example, the couriers 114 may use respective courier devices 122, such as smart phones, tablet computers, wearable computing devices, laptops, or the like, and these courier devices 122 may have installed thereon the courier application 132. The courier application 132 may be configured to receive the order information 112 from the service computing device 102 to provide a particular courier 114 with information for delivering a particular order to a buyer delivery location 116. The courier application 132 may further enable the courier 114 to respond to the service computing device 102 to confirm acceptance of a delivery job and to subsequently provide an indication of completion of a delivery job when the delivery has been made.

Additionally, the courier application 132 may provide the service computing device 102 with an indication of a current location of a particular courier device 122. For instance, one or more location sensors associated with each courier device 122 may provide location information to the courier application 132. Based on this location information, the courier application 132 may send location information 134 to the service computing device 102, such as by providing an indication of a geographic location of each courier device 122 of each active courier 114. Thus, a subset of courier devices 122 associated with active couriers may communicate with the service computing device 102, and may send courier location information 134 obtained from one or more location sensors associated with each courier device 122, such as a respective GPS receiver (not shown in FIG. 1). In some cases, another subset of courier devices 122 associated with inactive couriers may be periodically pinged by the service computing device 102 to determine interest in becoming active and, if so, requesting current location information of the associated inactive courier. Inactive couriers who are interested in being activated may allow their courier devices 122 to respond with their location information, while those who are not interested in being activated may keep their location information private by not responding. In some examples, the courier application 132 and the service computing device 102 may communicate with each other via one or more APIs. Alternatively, in other examples, the courier device 122 may receive the order information 112 via an SMS text message, a voicemail, a telephone call, or the like.

The one or more networks 106 can include any appropriate network, including a wide area network, such as the Internet; a local area network, such an intranet; a wireless network, such as a cellular network; a local wireless network, such as Wi-Fi; close-range wireless communications, such as BLUETOOTH® and BLUETOOTH® low energy; a wired network, including fiber optics and Ethernet; any combination thereof, or any other suitable communication network. Components used for such communication technologies can depend at least in part upon the type of network, the environment selected, or both. Protocols for communicating over such networks are well known and will not be discussed herein in detail. Accordingly, the service computing device 102, the buyer devices 128, and the courier devices 122 are able to communicate over the one or more networks 106 using wired or wireless connections, and combinations thereof.

In the illustrated example, the service computing device 102 includes an order processing module 136 that may be executed by the service computing device 102 to provide, at least in part, the order processing functionality attributed to the service computing device 102. The order processing module 136 may receive the order information 108 from the buyers 110 and may associate the order information 108 with buyer account information 138 stored with buyer information 140 that is maintained by the service computing device 102. For instance, based on buyer identifying information that may be included with the order information 108, such as a buyer account identifier, a buyer name, or the like, the order processing module 136 may associate particular order information 108 with a particular buyer account in the buyer account information 138. The order processing module 136 may access a buyer account included in the buyer account information 138 to charge a particular buyer account for a particular order.

Furthermore, the order information 108 received from the buyer may indicate buyer location information 142. For example, the buyer location information may be determined by the buyer application 130 from a GPS receiver associated with the buyer device 128. The buyer application 130 may use this location information as the delivery location 116 for a particular order. In other examples, the buyer 110 may manually enter an address into the buyer application 130 that may be used as the delivery location 116 for an order. The buyer application 130 may store the delivery location 116 used for a past order so that the buyer 110 does not have to reenter the delivery location for a subsequent order. In some examples, the buyer application 130 may use the location information from the GPS receiver on the buyer device 128 to confirm that an assumed delivery location for a current order corresponds to a previously entered delivery location. If there is a discrepancy, the buyer application 130 may request that the buyer select/confirm a delivery location prior to presenting other user interfaces to the buyer.

Additionally, if a particular buyer 110 is located outside of a current delivery region when the buyer 110 opens the buyer application 130, the buyer application 130 may send the buyer's current location to the service computing device 102. The service computing device 102 may store the buyer's current location in association with an "application-open event" even though there is not an order associated with the buyer's current location. The buyer's current location outside of the delivery region may be correlated with other application-open events received from other buyer devices 128 that are within a threshold distance of one another. If the service computing device 102 receives a sufficient number of application-open events in a sufficient density in an area outside of a current delivery region, the service computing device 102 may dynamically extend the delivery region to include the area outside of the current delivery region such as by selecting one or more couriers 114 to provide delivery services to this area.

In addition, prior to accepting an order from a buyer 110, the order processing module 136 may determine that at least one courier 114 is within a threshold delivery travel time of the delivery location 116 of the particular buyer 116, and that the at least one courier 114 has an inventory of one or more of the items 118 available to fulfill an order of the particular buyer 116. For example, when a buyer 110 opens the buyer application 130, the order processing module 136 may determine a current courier location 120(1)-120(M) associated with each courier 114(1)-114(M). Furthermore, the order processing module 136 may determine which of these couriers 114(1)-114(M) are within a threshold distance, or otherwise within a threshold delivery travel time, of the anticipated delivery location 116 of the particular buyer 110. As an example, the threshold distance may be determined based on how far a courier is predicted to be able to travel within 10-15 minutes or less, e.g., whether the courier travel time will take more than 10-15 minutes for the particular courier 114 to arrive at the delivery location 116 of the particular buyer. If so, then the courier 114 is treated as being outside of the threshold distance from the particular buyer 110.

Furthermore, of the couriers 114 that are determined to be within the threshold delivery travel time of the particular buyer 110, the order processing module 136 may determine a current inventory of each of these couriers 114. For instance, the courier information 144 maintained by the service computing device 102 may include courier account information 146, courier inventory information 148, and the courier location information 134. When the buyer 110 opens the buyer application 130, such as for placing an order, the order processing module 136 may determine that there is currently at least one courier 114 within a threshold delivery travel time of the buyer and that the courier currently has at least one item 118 in the courier's inventory.

Based on determining that there is a courier 114 having one or more items 118 and further determining that the courier 114 is within a threshold delivery travel time of the buyer 110, the order processing module 136 may send item information 150 to the particular buyer device 128. The item information 150 may indicate a number of items that are currently available in the inventory of one or more couriers 114 that are within the threshold delivery travel time of the particular buyer 110. Accordingly, the inventory information 148 may track of how many items 118 each courier 114 currently has in the respective courier's inventory. Furthermore, if there are multiple couriers 114 within the threshold delivery travel time of the particular buyer 110, the item information 150 may include information about the items 118 in the respective inventories of each of the multiple couriers 114. For instance, one courier 114 may have an inventory of a first type of item, such as burritos, while another courier 114 may have an inventory of a second type of item, such as salads, sandwiches, etc. Alternatively, both couriers may have inventories of the same type(s) of items. In response to receiving the item information 150, the buyer application 130 may present one or more user interfaces to enable the buyer 110 to place an order for a number of items 118 up to the total number of items currently available in the courier's inventory.

In response to receiving an order from a buyer device 128, the order processing module 136 may send the order information 112 to a particular courier 114 that was determined to be within the threshold delivery travel time of the buyer's delivery location 116. For instance, the order information 112 may request that the particular courier 114 deliver the ordered item(s) 118 to the particular buyer's specified delivery location 116. Furthermore, the order processing module 136 may change the inventory information 148 associated with the selected courier 114 to subtract the number of items ordered by the particular buyer 110 from the current inventory of the selected courier 114.

The selected courier 114 may use the courier application 132 on the courier device 122 to receive a message with order information 112, and to respond with a reply message indicating acceptance of the delivery job. The selected courier 114 may subsequently deliver the ordered item(s) 118 to the particular buyer 110 at the indicated delivery location 116. When the courier 114 has completed delivery of the item(s) 118 to the delivery location 116, the courier 114 may use the courier application 132 to inform the order processing module 136 that the delivery has been completed. The order processing module 136 may access a courier account included in the courier account information 146 for the selected courier 114 to credit the courier account of the selected courier 114 with payment for the delivery job.

The order processing module 136 may store information associated with each order as past order information 152. For instance, the past order information 152 may include a day of the week, date, and time of day at which each order is received from the respective buyer 110 and delivered to the respective delivery location 116. The past order information 152 may further include, for each order: buyer identifying information; item(s) ordered; merchant identifying information; the merchant pickup location 126; the delivery location 116; location 120 of the courier when the courier accepted the job for delivery of the order; time that the courier arrived at the delivery location; time that the courier left the delivery location; amount paid for the order; any feedback from the buyer, including any complaints or indications of item spoilage; as well as other information, as discussed additionally below.

Furthermore, the service computing device 102 may maintain merchant information 154, which may include various information about the merchants 124 from which the items 118 are obtained. For instance, the merchant information 154 may include merchant account information, a number of items obtained by the couriers 114 from each merchant 124 on each date, amount paid to each merchant for each item, as well as other information regarding the merchants 124, as discussed additionally below. As one example, the service provider 104 may provide electronic payment to the respective merchants 124 based on the number of items 118 picked up by the couriers 114 from the respective merchants 124.

An item selection module 156 may be executed by the service computing device 102 to determine which items 118 to offer to buyers each day and, thereby, which items the respective couriers 114 should pick up from a particular merchant 124 at a particular time. For example, the item selection module 156 may determine item selection information 158, such as by making a selection of items to be offered by the service. In some examples, when initially determining candidate items to offer for delivery by the service, the item selection module 156 may use item information received from a traditional delivery business and/or received from brick-and-mortar merchants in the region in which the service is operating. For instance, the item selection module 156 may determine the best selling items from a plurality of merchants that fall within selected item categories and that satisfy other parameters, such as entrée-sized items, e.g., sandwiches, burritos, salads, and so forth. Thus, in some cases, side items and items with short spoilage times may be excluded from the candidate items.

In some examples, when selecting one or more candidate items, the item selection module may rank the candidate items based at least in part on total number of sales over a period of time within a target geographic region. For instance, suppose that over the past month, "Bimma's Burger Restaurant" sold 10000 super cheeseburgers, 5000 regular burgers, and 3000 chicken sandwiches. Further, suppose that "Angela's Tex-Mex Restaurant" sold 9000 steak burritos and 6000 chicken burritos, and that Cathy's Salad Restaurant" sold 4000 pasta salads and 3000 chef salads, and so forth. The item selection module 156 may rank these items along with other items from these merchants and items sold by a plurality of other merchants, and may select several of the top ranked items as candidate items to be offered by the delivery service. In this example, suppose that the top ranked items are Bob's super cheeseburgers and Angela's steak burritos based on total numbers sold. Further, while the 4000 pasta salads sold by Cathy's salad are smaller in number sold than the 5000 regular burgers sold by Bimma's and the 6000 chicken burritos sold by Angela's, the pasta salad may be the best seller in a salad or vegetarian category. Accordingly, selection of items to offer to buyers may be based on category of item as well as number of items sold.

Upon selection of a candidate item, the service may offer the candidate item to buyers through the buyer application, and may determine an M/O value for each candidate item. For instance, if after one or more trial periods, the candidate item has an M/O value that is greater than a threshold M/O value, e.g., 20-30%, the item selection module 156 may select the particular item to be a regularly offered item, such as in a rotation of items offered by the delivery service. As one example, the service may offer each selected item 1 to 2 days a week. Accordingly, item selection module 156 may determine from past order information 152 which items have higher M/O values than other items and/or have M/O values that exceed the minimum threshold. For instance, the item selection module 156 may only select items to be regularly offered to buyers if the items have been determined to have an M/O value greater than the threshold M/O value.

Furthermore, the number of each item is that the courier initially stocks into inventory may be based, at least in part, on the M/O value for each item. For instance, suppose, based on past orders, that the item selection module 156 determines that Angela's steak burrito has an M/O value of 55% and that Cathy's pasta salad has an M/O value of 25%. Accordingly, suppose that on a particular day, the lunch menu includes Angela's steak burritos and Cathy's pasta salad. The item selection module 156 may recommend that each courier stock twice as many of Angela's steak burritos as Cathy's pasta salads for each inventory reload, e.g., eight burritos and four pasta salads.

Figure 2:
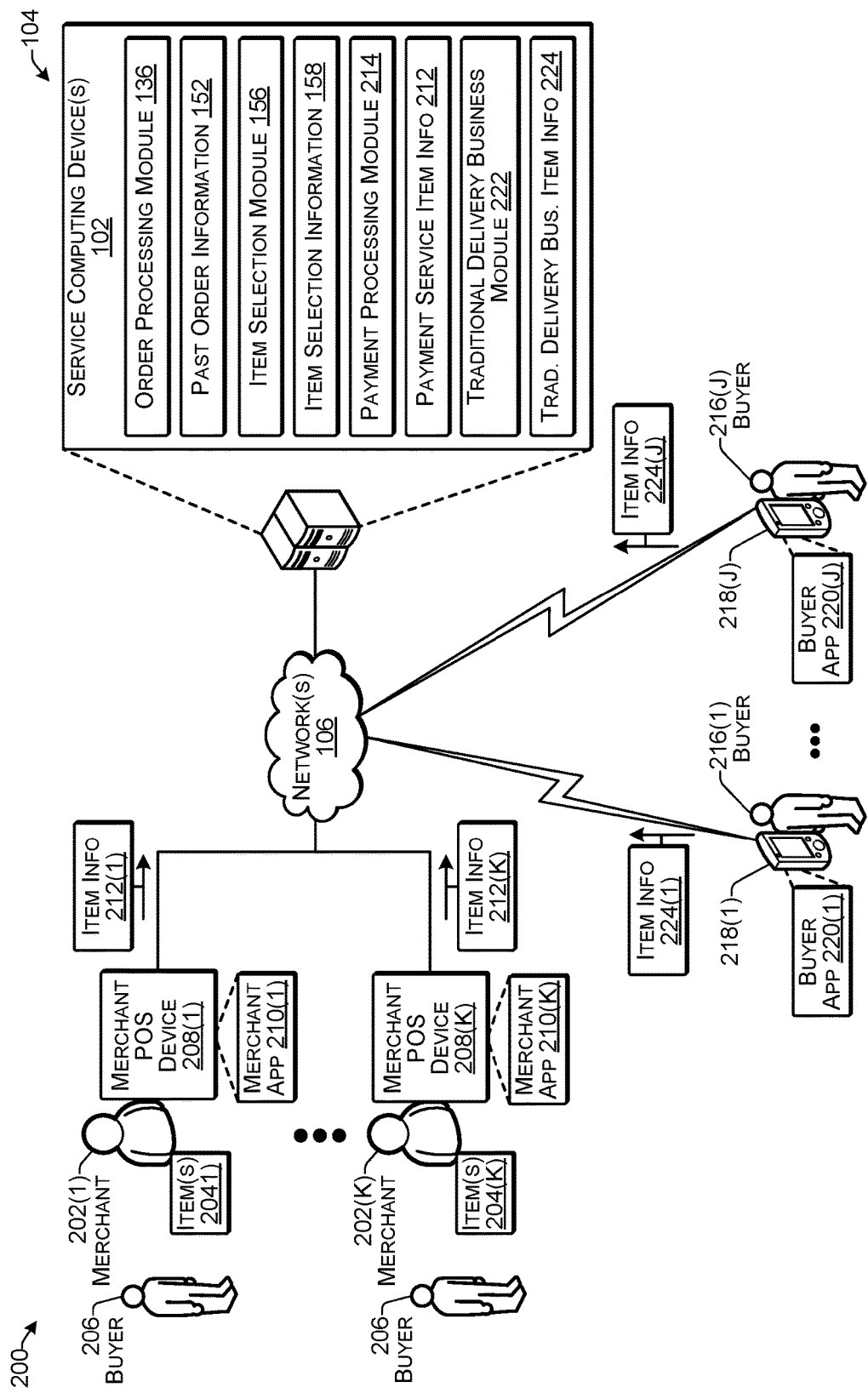
FIG. 2 illustrates an example of receiving item information according to some implementations.

FIG. 2 illustrates an example 200 of one or more systems for obtaining item sales information within a targeted region according to some implementations. For instance, as mentioned above, the item selection module 156 may obtain item information from a plurality of brick-and-mortar merchant sales and/or from sales of a traditional delivery business. As one example, the service provider 104 or another service provider (not shown) may offer a payment service used by a plurality of merchants 202(1)-202(K). The merchants 202 may correspond at least in part to the merchants 124 discussed above, and may offer items 204(1)-204(K) for sale to buyers 206. Each merchant 202(1)-202(K) may include a respective merchant point-of-sale (POS) device 208(1)-208(K) that the respective merchant 202 may use for processing payments made by the buyers 206 for one or more of the items 204. For example, a respective instance of a merchant application 210(1)-210(K) may execute on each merchant POS device 208(1)-208(K).

The merchant application 210 may communicate respective item information 212(1)-212(K) as well as other transaction information to a payment processing module 214 executed by the service computing device 102 and/or other service computing devices of the service provider 104 or another service provider. For example, the payment processing module 214 may receive payment information from the merchant POS devices 208, and may process payments made by the buyers 206 on behalf of the merchants 202, such as by submitting payment card information to banking computers (not shown in FIG. 2), tracking payments received by the merchants 202, providing accountings to the merchants 202, and so forth. Consequently, the item selection module 156 may receive the payment service item information 212 obtained from the plurality of merchants 202, and may determine a ranking of top selling items in a suitable item category, such as entrée items or other main dish items sold by certain ones of the merchants 202. From this ranking of top selling items, the item selection module 156 may select one or more items as candidate items for the fast delivery service herein as discussed above.

Additionally, or alternatively, the service provider 104 or another service provider may operate a traditional delivery business in which a plurality of buyers 216(1)-216(J) are able to use buyer devices 218(1)-218(J) having instances of buyer applications 220(1)-220(J) for placing orders for delivery of items from the merchants 202 or other merchants in a geographic region within which the buyers 216 are located. For example, the buyer application 220 may communicate with a traditional delivery business module 222 executed by the service computing device 102 or other suitable service computing device of the service provider 104 or another service provider. The buyer application 220 may receive a list of merchants that offer items that may be ordered by the buyer 216 for delivery. The buyer 216 may use the buyer application 220 to place an order for an item 204 from the menu of a selected merchant 202. The buyer application 220 sends the order, including item information 224 to the traditional delivery business module 222 at the service computing device 102.

The traditional delivery business module 222 may communicate the order to the selected merchant 202. The selected merchant 202 prepares the item and a courier (not shown in FIG. 2) picks up the item and delivers the item to the buyer 216. Accordingly, the traditional delivery business module 222 receives item information 224(1)-224(J) from the respective buyer devices 218(1)-218(J) and may provide this traditional delivery business item information 224 about the items ordered by buyers 216 to the item selection module 156. The item selection module 156 may determine a ranking of top selling items in a suitable item category, such as entrée items or other main dish items ordered by the plurality of buyers 216(1)-216(J). From this ranking of top selling items, the item selection module 156 may select one or more items as candidate items for the fast delivery service herein as discussed above and as discussed additionally below.

Figure 3:
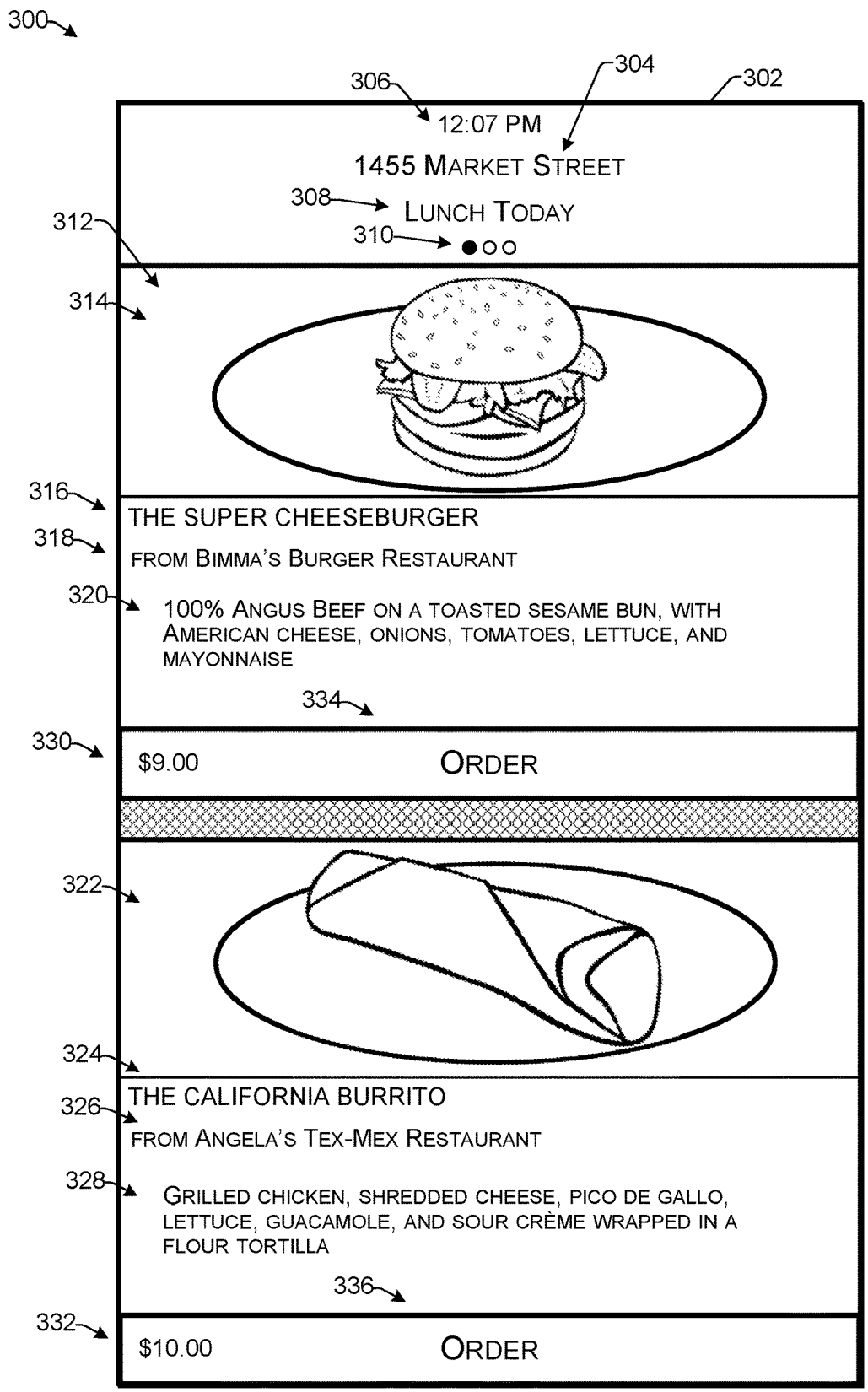
FIG. 3 illustrates an example user interface for enabling a buyer to place an order according to some implementations.

FIG. 3 illustrates an example graphic user interface (GUI) 300 for presenting item information on a display 302 associated with the buyer device 128 according to some implementations. For instance, the item selection module 156 may select one or more items to be offered during a particular time period on a particular day. The items may be selected based on item selection logic discussed additionally below with respect to FIG. 5. The item selection module 156 may select the items, may determine the number of items predicted to be ordered by buyers in particular areas, the number of each type of item recommended for each courier, and so forth. The item information may be passed to the order processing module 136, which may inform the merchants of a number of items to prepare. The order processing module 136 may further inform each of the couriers of a number of each type of item to pick up, as well as a geographic location to which to go after picking up the items to await incoming orders. In addition, the order processing module 136 may send item information to the buyer applications to be used for presentation of the GUI 300.

The GUI 300 presents information about the items that may be chosen by a buyer using the GUI 300 to place an order for delivery of one or more of the items. The GUI 300 includes an indicated delivery location 304, such as an address to which the buyer's order is to be delivered. In some examples, the delivery location 304 may be determined by the buyer application based on a current location of the buyer device 128, as indicated, e.g., by one or more location sensors included in the buyer device 128. For example, the current location may be determined from GPS information provided by an onboard GPS receiver, and/or from wireless access point information, cell tower information, or the like, determined through one or more communication interfaces, and/or through various other techniques.

In some examples, the delivery location 304 may be entered manually by the buyer, may have been previously used by the buyer, and/or may be a default location that may be changed by the buyer through interaction of the buyer with the GUI 300. In some examples, the items available for delivery may change based on the indicated delivery location 304. Accordingly, the buyer application may determine the indicated delivery location 304 prior to presentation of the item information.

The GUI 300 further includes a current time 306 and an indication 308 that the user is ordering for a current delivery period, which is lunch time in this example. Further, the GUI 300 includes an indicator 310, which indicates that the user may swipe the screen to view items available at other delivery periods, such as dinner time or lunch tomorrow. In some cases, various different items obtained from different merchants may be available based on the time of day and day of the week.

In the illustrated example, the GUI 300 presents item information 312 about two items. In some cases, the couriers herein may typically only have one or two types of items in inventory. The item information 312 includes a representative image 314 and a name 316 of a first item, e.g., "The Super Cheeseburger". The item information for the first item may further indicate the merchant name 318, e.g., "Bimma's Burger Restaurant", and a description 320 of the first item. In addition, the item information for a second item may include a representative image 322, and a name 324 of the second item, e.g., "The California Burrito". The item information for the second item may further include the merchant name 326, e.g., "Angela's Tex-Mex Restaurant", and a description 328 of the second item. Further, while information about two items is presented in this example, information about other items, if currently available for delivery, may be presented in the GUI 300, such as by the buyer scrolling or otherwise traversing through the item information.

In the GUI 300 of this example, the current time 306 is indicated to be 12:07 PM. By default, the buyer application may be configured to assume that the buyer wishes to order an item for delivery as soon as possible, rather than at some point later in the day or the next day. Accordingly, based on this assumption, the GUI 300 may default to presenting item availability based on the buyer wanting to order now and have delivery within, e.g., 15 minutes. In some examples, if the buyer alternatively wishes to have the order delivered at a later time, the buyer may be presented with an option for specifying a later delivery time.

Based on the assumption that the buyer would like to order an item now, the buyer application may receive and present item information for the current time period, e.g., as if the buyer wants the order placed immediately. Thus, the user interface 300 may present the item information for based on the current inventory of couriers within a threshold delivery travel time of the indicated delivery location 304 of the buyer. For instance, as mentioned above, the order processing module may determine couriers within a threshold delivery travel time of the delivery location 304, determine the current inventories of those couriers, and may send item information to the particular buyer device based on the current inventories. In some examples, the threshold delivery travel time may be based on the ability of a courier to arrive at the delivery location within a threshold time such as 15 minutes or less. The travel time may be determined based on the distance between the courier location and the delivery location and, in some cases, further based on the type of vehicle that the courier is using. Accordingly, in some cases, the threshold distance may change somewhat depending on current traffic conditions, an area of a city in which the delivery location is located, and so forth, but the threshold delivery travel time may be constant.

The GUI 300 may further include a price 330 for the first item and a price 332 for the second item. For instance, the buyer may tap on or otherwise select a first area 334 of the GUI 300 to select the first item, or the buyer may tap on or otherwise select a second area 336 of the GUI 300 to select the second item. Accordingly, the areas 334 and 336 may serve as virtual controls to enable the buyer to select one of the items for delivery. In some examples, a delivery fee may be included in the prices 330 and 332 of the items presented in the GUI 300, while in other examples, a separate delivery fee may be added to a total presented in a subsequent user interface presented to the buyer following selection of one of the virtual controls 334 or 336.

Figure 4:
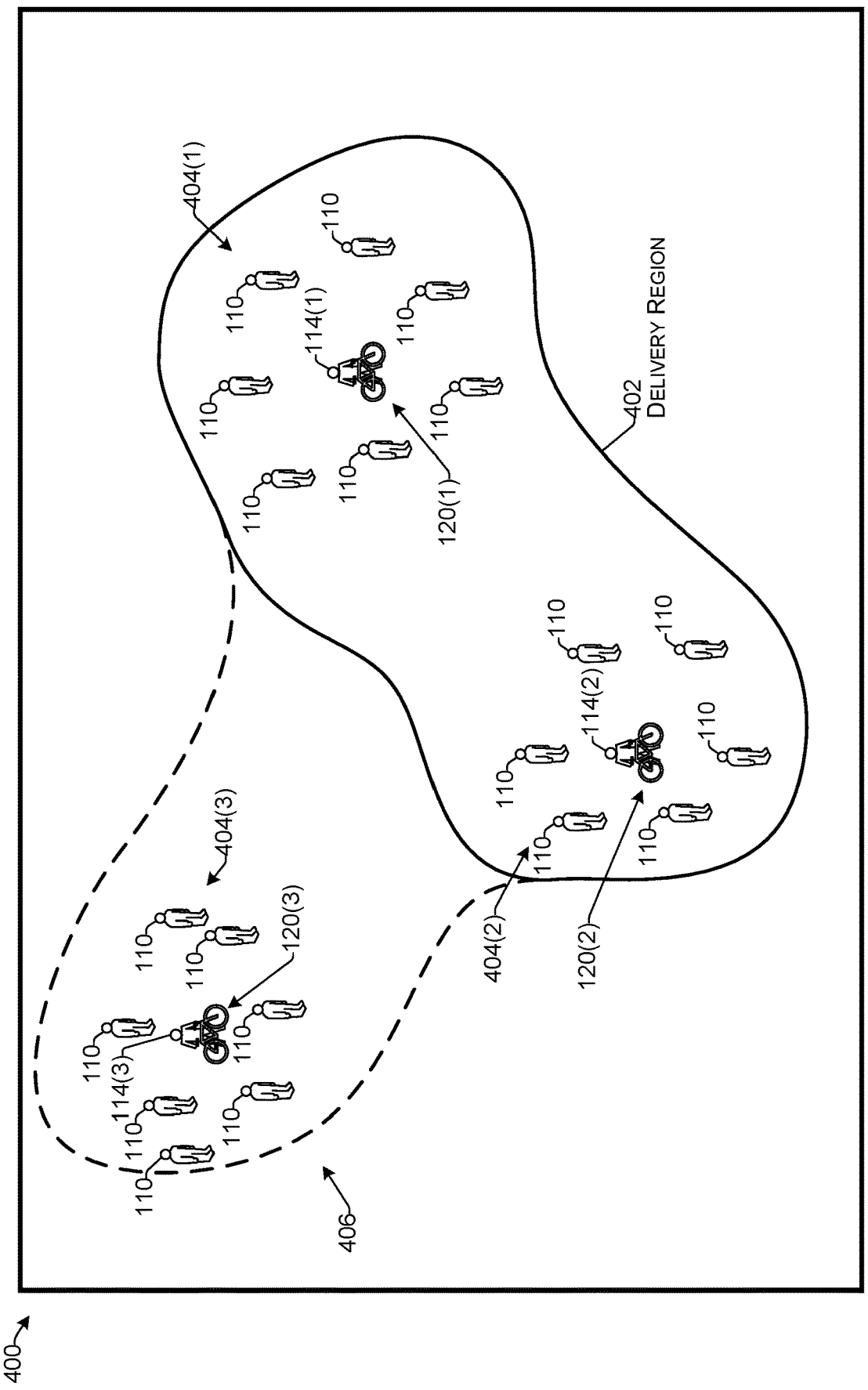
FIG. 4 illustrates an example delivery region according to some implementations.

FIG. 4 illustrates an example 400 of determining delivery regions for fast delivery of items according to some implementations. In this example, a current delivery region 402, such as within a city, may be based at least in part on a prediction of delivery locations of buyers 110 who are predicted to order items from a courier. The number of items that are predicted to be sold and the predicted location of buyers may vary based in part on the items selected by the item selection module 156, and may further vary based on other factors, such as the day of the week. For example, based on the past order information 152 discussed above with respect to FIG. 1, the delivery region 402 may have a first configuration for weekdays, and a different second configuration for weekend days. Accordingly, the delivery region 402 may change dynamically based on the items selected by the item selection module 156 and other factors, such that buyers within a threshold travel time of a courier are able to order items, and buyers farther away are not able to order items.

In the illustrated example, the order processing module 136 may determine to have at least one courier 114(1) stationed at a first courier location 120(1) and at least one second courier 114(2) stationed at a second courier location 120(2). For instance, the first courier location 120(1) may be selected based at least in part on a prediction that a first plurality of buyers 404(1) will place orders for one or more selected items from the first courier 114(1). Similarly, the second courier location 120(2) may be selected based at least in part on a prediction that a second plurality of buyers 404(2) will place orders for one or more selected items from the second courier 114(2). The prediction of the number of orders that might be received in a particular area of the delivery region may change depending on the time of day and day of the week. For example, the number of orders received on a weekday may differ substantially from the number of orders received on a weekend day, such as based on whether the area of the delivery region is in a business district or residential district.

In addition, the delivery region 402 may be changed dynamically based on information received from buyer applications of buyers 110 that are located outside of the delivery region 402. For instance, suppose that multiple application-open events are received from a third plurality of buyers 404(3) located in an area outside of the current delivery region 402. In some cases, the item selection module 156 may use clustering techniques, such as based on the frequency and density of the application-open events to determine a new area 406 to add to the service region 402. For example, the order processing module 136 may determine distances between the locations of the buyers 110 when the application-open events occurred and may assume that these locations would correspond to delivery locations if the third plurality of buyers 404(3) were to place orders for delivery of the items. If the number of application-open events received within a threshold time period are from a sufficient number of buyers 110 to meet a minimum threshold number of buyers, and are clustered into an area sufficiently close to each other, the order processing module 136 may determine to expand the delivery region to encompass the area 406 that includes the cluster of locations associated with the third plurality of buyers 404(3).

Based on the locations determined from the application-open events received from the third plurality of buyers 404(3), the order processing module 136 may recommend that a third courier 114(3) be stationed at a third courier location 120(3) that is within a threshold delivery travel time of at least some of the plurality of buyers 404(3). In some examples, threshold delivery travel time may be selected such that the third courier 114(3) is able to arrive at the locations associated with the buyers 110 in the third plurality of buyers 404(3) within a threshold time, such as 15 minutes or less. Additionally, in some cases, the third plurality of buyers 404(3) may be determined using clustering techniques. For instance, a centroid may be determined for the cluster, and the third courier location 120(3) may be selected based at least in part on the cluster centroid. Further, as mentioned above, in some examples the expansion of the delivery region 402 may be for certain times of day, for certain days of the week, and for certain types of items that are selected by the item selection module 156.

Figure 5:
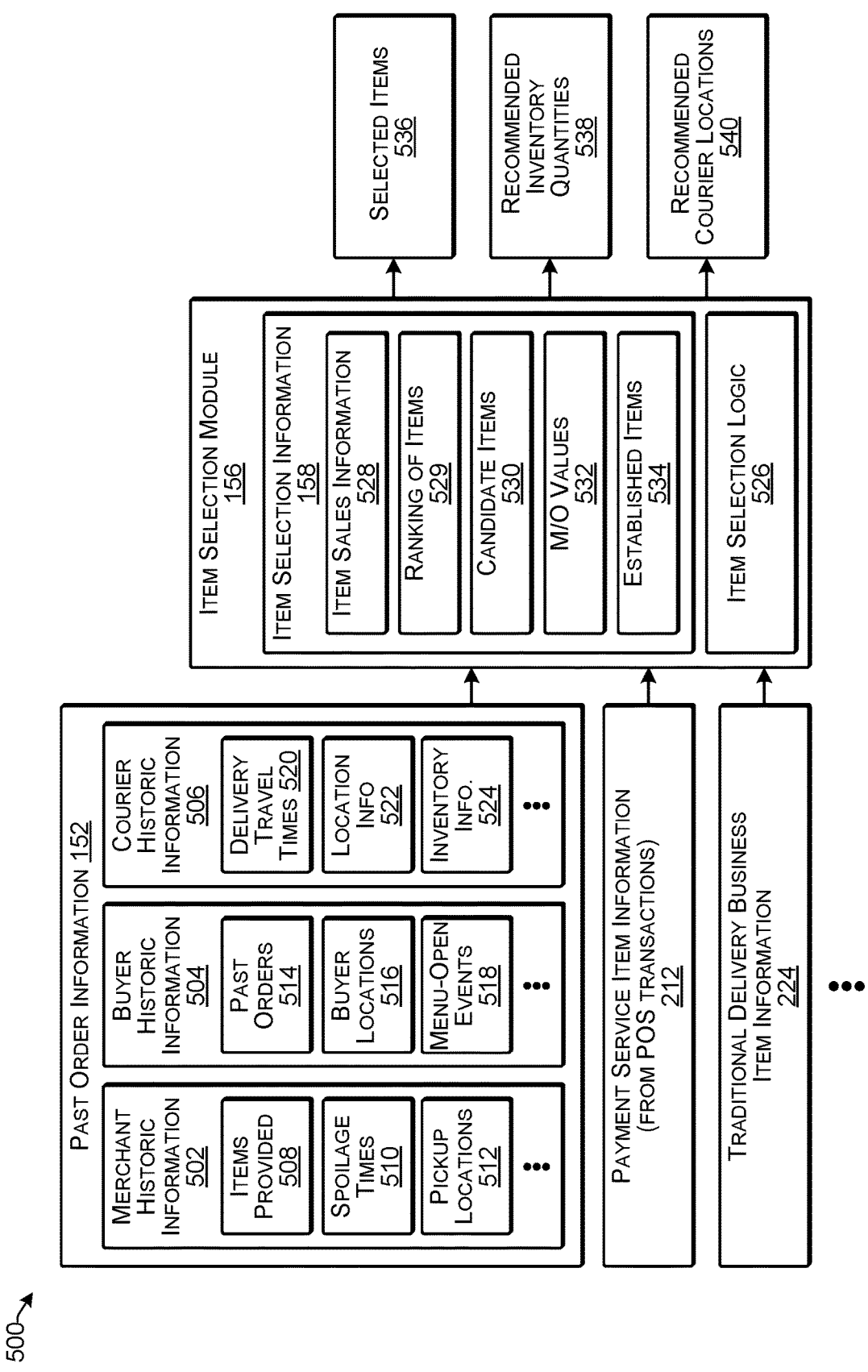
FIG. 5 is a block diagram illustrating an example of selecting items according to some implementations.

FIG. 5 is a block diagram illustrating an example framework 500 for selecting items to offer to buyers for fast deliveries according to some implementations. In this example, the item selection module 156 may receive the past order information 152 including merchant historic information 502, buyer historic information 504, and courier historic information 506. In addition, the item selection module 156 may receive payment service item information 212 from POS transactions conducted at brick-and-mortar merchant locations and/or the item selection module 156 may receive item information 224 from a traditional delivery business. Further, while several types of item information that may be used by the item selection module 156 are illustrated, in other examples, other or additional types of item information may be used by the item selection module 156, as discussed herein and/or as will be apparent to those of skill in the art having the benefit of the disclosure herein.

The merchant historic information 502 includes historic order information related to the merchants, e.g., various types of information related to the merchants that participate in the service of the service provider 104. For instance, the merchant historic information 502 may include items provided 508 by each merchant at particular times on particular days of the week, particular dates, and the like. Further, the merchant historic information 502 may include spoilage times 510 for the items provided by each merchant and the pickup locations 512 associated with each merchant. For example, the spoilage time 510 of a particular item may initially be set by the corresponding merchant and/or the service provider. In some examples, the service provider may provide special packaging to increase the spoilage time of the items. Subsequently, if a threshold quantity of spoilage complaints is received from buyers of a particular item, the threshold spoilage time 510 for that item may be decreased. Alternatively, if spoilage complaints are not received for an item, the spoilage time 510 for that item may be gradually increased.

Additionally, the buyer historic information 504 includes historic order information related to the buyers. Examples of buyer historic information 504 may include past orders 514, e.g., a time of day, day of the week, and date on which each order was placed, item ordered, amount paid, and so forth. The buyer historic information 504 may further include buyer locations 516, including delivery locations to which each order was delivered and locations of the buyer devices during application-open events, such as in the case in which the application was opened, but an order was not placed because the buyer was outside a current delivery zone.

Additionally, the buyer historic information 504 may include menu-open events 518. For instance, for determining the M/O value for items, the item selection module 156 may determine how many times buyers open the buyer application and view the available items on their respective buyer devices in comparison with how many times the buyers actually place an order following opening of the buyer application. For instance, menu open events may differ from application-open events in that a buyer may be able to open the application but may be outside of a delivery region and therefore unable to view the items available for delivery. Consequently, these application-open events are not counted when determining the M/O value for an item since no items were actually offered to the particular buyers. On the other hand, when a buyer opens the buyer application to view a menu of one or more available items, and the buyer decides not to order an item, this may be counted towards determining the M/O value for the item.

Further, the courier historic information 506 includes historic order information related to the couriers. For example, the courier historic information 506 may include courier delivery travel times 520, which may indicate the time that an order was assigned and the time that the order was delivered, e.g., how long it took each courier to arrive at the delivery location and handoff the item after being assigned an order. Additionally, courier location information 522 may include locations of individual couriers at different times of day, for different days of the week, and in different parts of the service region. For instance, the courier location information 522 may indicate how long it took each courier to travel known distances, such as from the location at which the order was assigned to the delivery location. Thus, the item selection module 156 may predict courier travel times based on a conversion factor determined from the courier location information. For example, the courier location information 522 may indicate that, on average, couriers on bicycles are able to travel about four miles in 15 minutes. Consequently, a threshold delivery travel time of 15 minutes, may correspond to a threshold distance that may be four miles or less for bicycle couriers. The distance of the courier from the delivery location may be determined from respective GPS locations or addresses using mapping software, a mapping website, or the like.

In addition, the courier historic information 506 may include inventory information 524, such as how many items a particular courier picked up and how long it took the courier to unload the entire inventory of items. Furthermore, the merchant historic information 502, the buyer historic information 504, and the courier historic information 506 may include additional types of information, with the foregoing being merely several examples of the types of information that may be used by the item selection module 156.

The item selection module 156 may employ item selection logic 526 for selecting items to be offered for delivery to buyers. The item selection logic 526 may include one or more algorithms, one or more computational models, a plurality of decision-making rules, or the like, configured to determine item sales information 528, candidate items 530, M/O values 532, and established items 534. Based on these considerations, the item selection logic may determine selected items 536 to be offered for delivery to buyers on particular days and/or at particular times of a day. In addition, based on the M/O values 532, and further based on how quickly couriers have delivered their entire inventories in the past when stationed at various different locations, and based on the item spoilage times 510 for particular items, the item selection logic 526 may determine recommended inventory quantity 538 of items for the couriers to pick up for their inventories. Further, the item selection logic 526 may determine recommended courier locations 540 for stationing couriers with the selected items 536 based on identifying clusters of buyer locations corresponding to high M/O values for the selected items 536.

As one example, the item selection logic 526 may determine item sales information 528 from, e.g., the payment service item information 212 and/or the traditional delivery business item information 224. For instance, as mentioned above, the item selection logic 526 may determine a ranking 529 of items in various different categories, such as based on a number of the items sold in each category over a period of time within a target geographic region. Examples of items that are ranked in the ranking 529 may include entrée items having spoilage times greater than a threshold spoilage time such as one to two hours, and falling into categories such as red meat items, poultry items, vegetarian items, or the like. As mentioned above, the item selection logic 526 may select, from the items sales information 528, several of the top selling items in each item category as candidate items 530. The item selection logic 526 may then offer these candidate items 530 on a trial basis until an M/O value 532 may be determined for each candidate item 530. Candidate items 530 that have been determined to have an M/O value over a threshold percent may be classified as established items 534. For example, established items 534 may be selected on a regular or otherwise recurring basis by the item selection logic 526 to be offered for delivery to buyers.

In addition, the item selection logic 526 may determine recommended inventory quantities 538 for couriers for the selected items 536 for a particular day and/or particular area of a delivery region. For instance, different areas of a delivery region may have different M/O values for the same item. For example, suppose that Angela's steak burrito has an M/O value of 75% in a first area of the delivery region, but only 45% in a second area of the delivery region, while Cathy's pasta salad has an M/O value of 25% in the first area and 45% in the second area. Furthermore, suppose that these items are the selected items 536 to be offered for lunch on a particular day. When determining recommended inventory quantities 538 for the couriers, a first courier who will be stationed in the first area may be recommended to have an inventory of three burritos for every pasta salad, while a second courier who will be stationed in the second area may be recommended to have an inventory of one burrito for every pasta salad. In addition, based on how quickly the couriers have delivered their entire inventories in the past when stationed at various different locations, and based on the item spoilage times 510 for particular items, the item selection logic 526 may recommend an initial inventory quantity 538 of each of the selected items 536 for the couriers to pick up for their inventories.

In addition, the item selection logic 526 may determine recommended courier locations 540 based on the M/O values 532 for the selected items 536 and/or past orders 514 for the selected items. For instance, item selection logic 526 may determine clusters of buyer locations from which orders are likely to be received based on the past orders 514 and based on M/O values for particular geographic areas, in which the buyer locations are clustered sufficiently close together so that a courier stationed at the cluster may fulfil orders within the threshold time. The item selection logic 526 may further determine the recommended courier locations 540 at which couriers may be stationed to wait for orders to be received by determining a centroid of a cluster of buyer locations and the recommended courier location 540 may be at or near to the centroid. For example, on a particular day, if couriers will have burritos in their inventory, the buyer location clusters may be calculated based on buyer locations 516 corresponding to past orders 514 for burritos, rather than for all past orders. Consequently, the recommended courier locations 540 may change dynamically day to day depending on the particular item being offered by the couriers on the particular day.

In some examples, when determining buyer location clusters, a plurality of buyer locations 516 may be provided to the item selection logic 526, such as in the form of longitude and latitude GPS coordinates. The item selection logic 526 may determine clusters of the buyer locations, such as based on any suitable clustering algorithm, e.g., density-based clustering, centroid-based clustering, or the like. As one example, a clustering algorithm, such as the k-means algorithm, may be used to determine clusters of delivery locations based at least in part on determining distances between the respective delivery locations. The determined distances may be converted to predicted courier travel times, e.g., based on the conversion factor discussed above, e.g., based on average courier travel times determined from the delivery travel times 520 and/or the courier location information 522. Furthermore, in some cases, the predicted delivery travel times 536 may include an average handoff time that is added in, e.g., an amount of time after the courier arrives at the delivery location for the courier to knock on the door and hand the item to the buyer.

As one example, when identifying buyer locations to include in a cluster, the maximum predicted courier travel time between any two locations included in the cluster may be less than twice the threshold delivery travel time. Thus, a courier may be stationed close to the center of a cluster (e.g., within a several minutes travel time) and may be able to reach any predicted delivery location in the cluster within the threshold delivery travel time. Additionally, in some examples, traffic information or other local condition information, such as may be obtained from an online map service, e.g., via a webserver or other network source, may also be taken into consideration in combination with the output of the item selection logic 526 when determining the predicted courier travel times.

Figure 6:
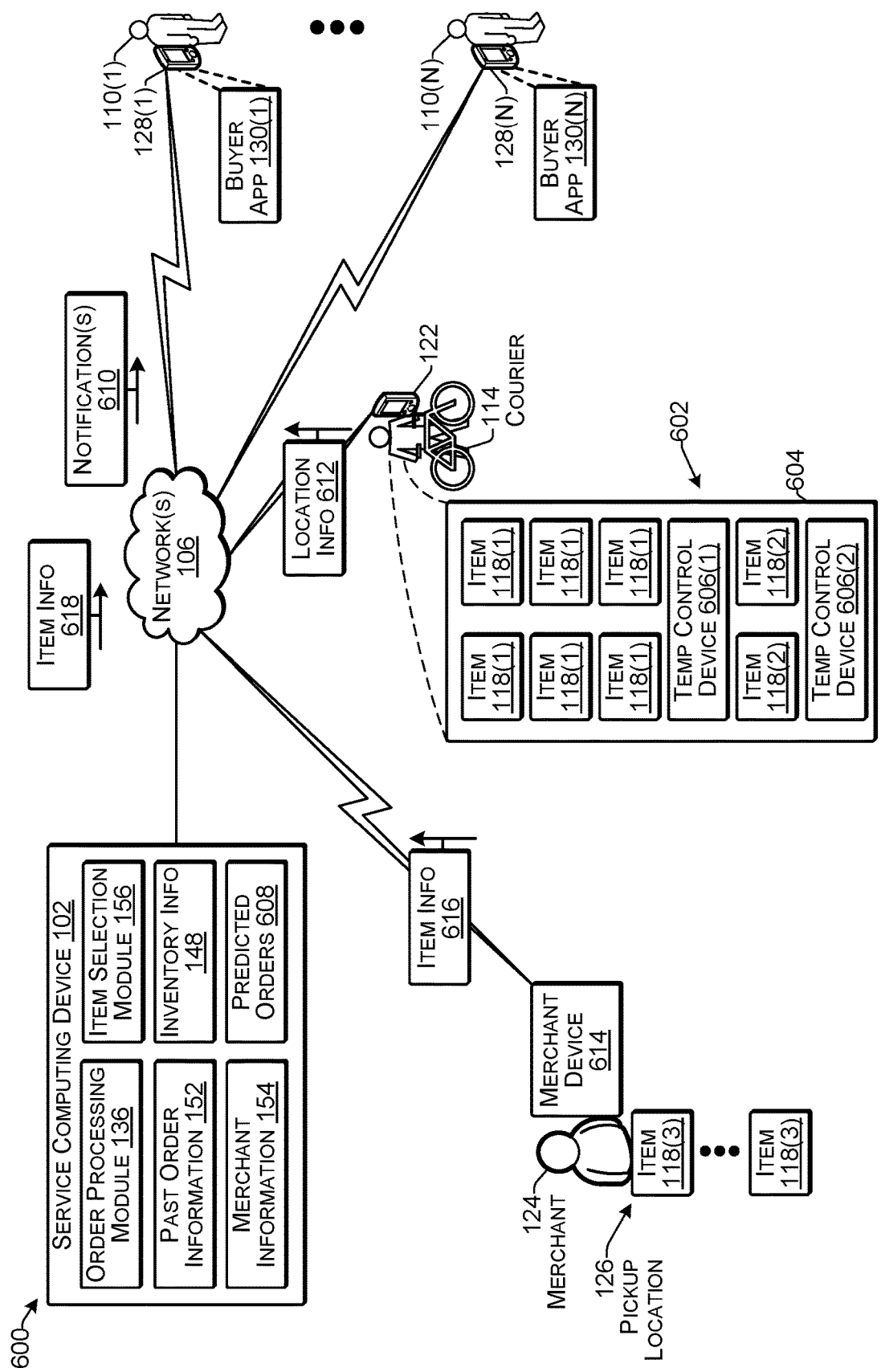
FIG. 6 illustrates an example of impromptu sales according to some implementations.

FIG. 6 illustrates examples 600 of impromptu selling of items according to some implementations. As a first example, suppose that the courier 114 has six of a first type of item 118(1) and two of a second type of item 118(2) in inventory. The items 118(1) and 118(2) may be contained in an insulated backpack or other type of travel container 602 that includes an insulated outer wall 604 and one or more temperature control devices 606, such as temperature control devices 606(1) and 606(2). For instance, in the case that the items 118(1) or 118(2) are to be kept hot to avoid spoilage, the temperature control devices 606 may be heat packs. Alternatively, in the case that the items 118(1) or 118(2) are to be kept cool to avoid spoilage, the temperature control devices 606 may be cold packs.

In this example, suppose that the second items 118(2) are ordered by buyers 110 and delivered by the courier 114. Further, suppose that the first items 118(1) in the inventory of courier 114 have not yet sold. For instance, suppose that the spoilage time for the first item 118(1) is 90 minutes, and suppose that the item selection module 156 has predicted, based on past order information 152, that the courier 114 would be likely to sell six of the first item 118(1) before 90 minutes elapsed, but that 45 minutes have already elapsed with no orders for the first item 118(1). Consequently, the likelihood that the courier 114 will be able to sell the current inventory of the six first items 118(1) before the spoilage time elapses is now low. Therefore, based on this determination, the order processing module 136 may initiate an impromptu sale of the first item 118(1).

In some examples, the order processing module 136 may compare the inventory information 156 for the courier 114 with predicted orders 608, which may have been determined by the item selection module 156 when selecting the items 118(1) and 118(2) to be offered. Based on the comparison, the order processing module 136 may determine that the orders for the first item 118(1) are less than the predicted orders 608 by a threshold amount. In response, the order processing module 136 may take action to attempt to increase orders for the first item 118(1) before the spoilage time associated with the first item 118(1) elapses.

As one example, upon determining that the number of orders received for the first item 118(1) are less than would be indicated by the predicted orders 608 by a threshold amount (e.g., 20%, 30%, etc.), the order processing module 136 may automatically reduce the price for the first item 118(1) in real time to avoid spoilage before the quantity of first items 118(1) in the current inventory of the courier 114 is sold. For instance, the order processing module 136 may send push notifications 610 to buyer devices 128(1)-12(N), such as by email, SMS text message, and/or in-application notification to the buyer application, e.g., via an API, to let the respective buyers 110(1)-110(N) know of the reduced pricing for the first item 118(1). For example, the buyers 110(1)-110(N) may have previously expressed an interest in receiving notifications 610 of reduced-price items. When determining buyers 110 to whom to send the notifications 610, the order processing module 136 may first determine the current location of the courier 114 based on location information 612 received from the courier device 122. The order processing module 136 may further determine, from the past order information 152, a plurality of buyer delivery locations from the past orders, and may only send the notifications 610 to buyer devices 128 of buyers 110 that have past delivery locations within a threshold travel time (e.g., 15 minutes or less) of the current location of the courier 114.

In some cases, the order processing module 136 may take into consideration the M/O value of the first item 118(1) when determining how much to drop the price. For instance, if the first item 118(1) normally has a relatively high M/O value, as compared with other established items offered by the service, the price of the first item 118(1) may be dropped by a smaller amount than would be the case if the first item 118(1) has a lower M/O value. After the price has been dropped for a threshold period of time, if orders for the first item 118(1) still are not catching up sufficiently with the predicted orders 608 (e.g., are behind the predicted orders by more than a threshold amount), the order processing module 136 may determine to again drop the price by an additional amount. Accordingly, the order processing module 136 may continue to incrementally reduce the price of the first item 118(1) as the spoilage time of the first item 118(1) elapses. This technique can enable the order processing module 136 to automatically lessen the chance that the first items 118(1) will spoil before being ordered and delivered to buyers.

As another example, the order processing module 136 may receive, from a merchant device 614 associated with a merchant 124, item information 616 about a current oversupply of a third item 118(3) available from the particular merchant 124. For instance, suppose that the merchant 124 made 100 gourmet hot dogs in anticipation of a sporting event, such as a football or baseball game, and poor weather has resulted in poor game attendance. The merchant 124 and/or the order processing module 136 may determine that sufficient in-store sales will not materialize over the next several hours. Consequently, the merchant 124 may employ the service provider to distribute the excess inventory to buyers 110 using the couriers 114 of the service provider. Thus, the merchant 124 may request and/or the order processing module 136 may recommend an impromptu sale of the third items 118(3) prior to expiration of a spoilage time threshold for the third items 118(3).

The service provider may use the techniques herein to enlist couriers 114 to distribute the unsold inventory of third items 118(3) to buyers 110 before the items spoil. In some cases, this may be performed automatically and on a relatively short timescale sufficient to distribute the items 118(3) before expiration of a threshold spoilage time associated with the items 118(3). For example, the item selection module 156 may determine a number of the items 118(3) to be sold and, based on past orders of the same or similar items, may determine areas of a delivery region having buyers 110 likely to order the items 118(3) and may determine a recommended quantity of items 118(3) to recommend for pickup by each courier 114 at the pickup location 126 of the merchant 124.

The order processing module 136 may determine whether a number of currently active couriers is sufficient to pick up and deliver the items 118(3). If not, the order processing module 136 may contact inactive couriers by pinging or otherwise communicating with the courier devices 122 of the inactive couriers to determine interest in becoming active. The order processing module 136 may further send notifications 610 to buyer devices 128 of buyers who have opted in to receiving such notifications, such as by email, text message, and/or in-application communications, such as based on an API. When determining buyers 110 to whom to send the notifications 610, the order processing module 136 may first determine a current location or predicted location of at least one courier 114 that has picked up a plurality of the items 118(3) based on location information 612 received from the courier device 122. The order processing module 136 may further determine, from the past order information 152, a plurality of buyer delivery locations from the past orders, and may only send the notifications 610 to buyer devices 128 of buyers 110 that have past delivery locations within a threshold travel time (e.g., 15 minutes or less) of the current location or predicted location of the courier 114. For example, the order processing module 136 may have recommended that the courier pick up the items 118(3) and travel to a recommended location, such as a buyer cluster centroid, as discussed above.

The order processing module 136 module may further send item information 618 to the buyer applications 130 that are opened following sending of the notifications 610, or that are otherwise opened after the items 118(3) are picked up by the couriers. For instance, the item information 618 may include the third item 118(3) in a listing of the items available for ordering listed in the GUI presented by the buyer application 130. Further, in some examples, the price of the third item 118(3) may be reduced incrementally as discussed above to further encourage fast sell off of the excess inventory before spoilage of the items 118(3). The service provider may credit an account of the merchant 124 associated with the merchant information 154 based on the number of the third items 118(3) picked up and/or sold.

Figure 7A:
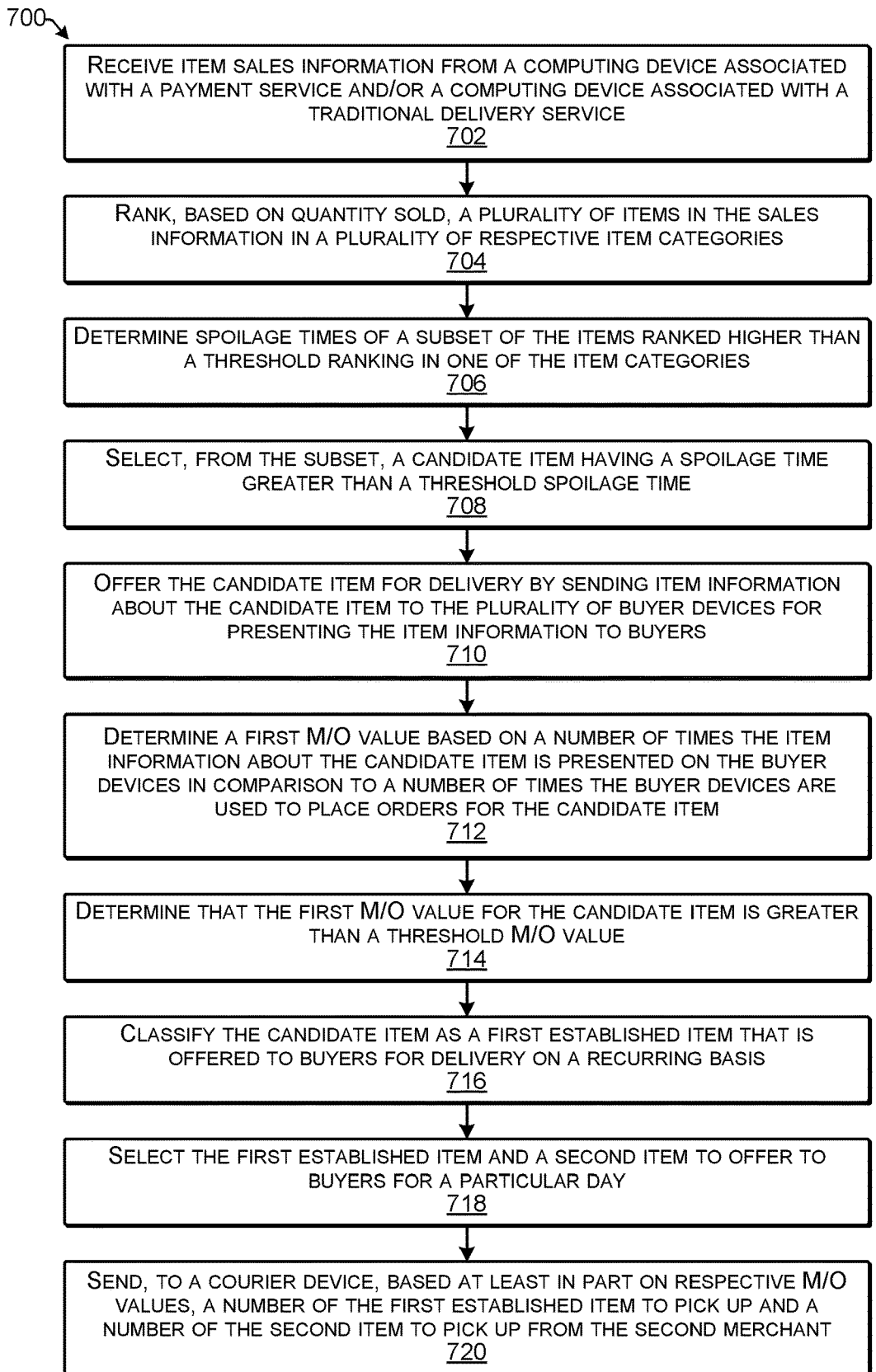
FIGS. 7A and 7B are flow diagrams illustrating an example process for selecting items according to some implementations.
Figure 7B:
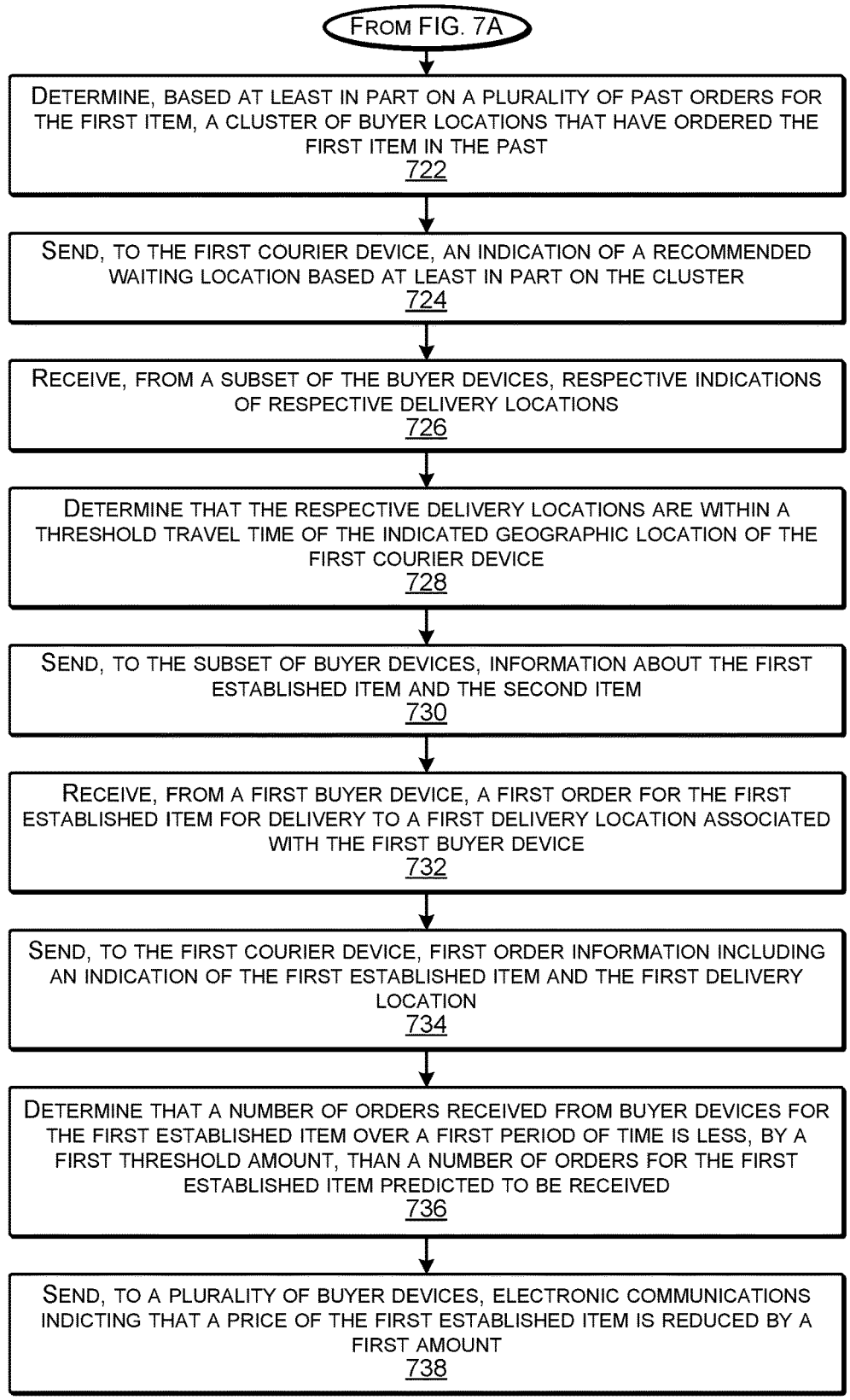
Figure 8:
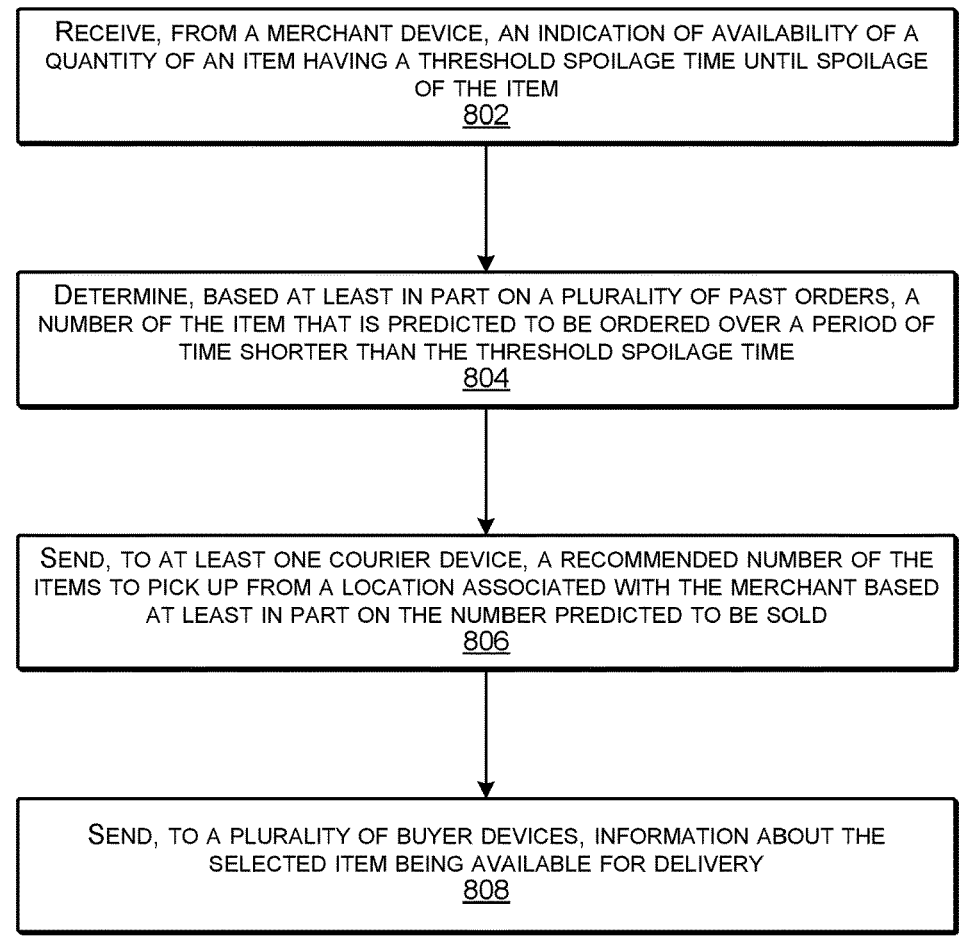
FIG. 8 is a flow diagram illustrating an example process for an impromptu sale according to some implementations.

FIGS. 7A, 7B, and 8 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

FIGS. 7A and 7B are flow diagrams illustrating an example process 700 for selecting items for fast deliveries according to some implementations. In some examples, the process 700 may be executed at least in part by the service computing device 102 or by another suitable computing device.

At 702, the computing device may receive item sales information from a computing device associated with a payment service and/or a computing device associated with a traditional delivery service.

At 704, the computing device may rank, based on quantity sold, a plurality of items in the sales information in a plurality of respective item categories. For instance, the item categories may be for entrée or main-meal items in certain categories, such as red meat dishes, poultry dishes, salad or vegetarian dishes, and so forth.

At 706, the computing device may determine spoilage times of a subset of the items ranked higher than a threshold ranking in one of the item categories. For instance, the computing device many initially determine a spoilage time based on a category of the item. The spoilage times may be subsequently refined based on feedback from buyers and/or couriers.

At 708, the computing device may select, from the subset, a candidate item having a spoilage time greater than a threshold spoilage time.

At 710, the computing device may offer the candidate item for delivery by sending item information about the candidate item to the plurality of buyer devices for presenting the item information to buyers. For instance, a plurality of couriers may stock the candidate item for a trial period to see how many orders are received.

At 712, the computing device may determine a first M/O value based on a number of times the item information about the candidate item is presented on the buyer devices in comparison to a number of times the buyer devices are used to place orders for the candidate item.

At 714, the computing device may determine that the first M/O value for the candidate item is greater than a threshold M/O value.

At 716, the computing device may classify the candidate item as a first established item that is offered to buyers for delivery on a recurring basis.

At 718, the computing device may select the first established item and a second item to offer to buyers for a particular day.

At 720, the computing device may send, to a courier device, based at least in part on respective M/O values, a number of the first established item to pick up and a number of the second item to pick up from the second merchant.

At 722, the computing device may send, to the first courier device, an indication of a recommended waiting location based at least in part on the cluster. For instance, the computing device may determine a cluster of past deliver locations based on a plurality of the past delivery locations associated with a particular item of a plurality of different items delivered in the past. For example, on a particular day, if couriers will have burritos in their inventory, the buyer location clusters may be calculated based on buyer locations corresponding to past orders for burritos, rather than for all past orders. Consequently, the recommended courier locations may change dynamically day to day depending on the particular item being offered by the couriers on the particular day.

At 724, the computing device may send, to the first courier device, an indication of a recommended waiting location within based at least in part on the cluster. In some examples, the recommended waiting location may be at or near to a centroid of the cluster.

At 726, the computing device may receive, from a subset of the buyer devices, respective indications of respective delivery locations. For instance, when buyers open the application, the indicated delivery location may be determined before item information is presented.

At 728, the computing device may determine that the respective delivery locations are within a threshold travel time of the indicated geographic location of the first courier device.

At 730, the computing device may send, to the subset of buyer devices, information about the first established item and the second item. Based on determining that the subset of buyers are within the threshold travel time of the courier, the buyer applications may present information about the items in the courier's inventory.

At 732, the computing device may receive, from a first buyer device, a first order for the first established item for delivery to a first delivery location associated with the first buyer device.

At 734, the computing device may send, to the first courier device, first order information including an indication of the first established item and the first delivery location.

At 736, the computing device may determine that a number of orders received from buyer devices for the first established item over a first period of time is less, by a first threshold amount, than a number of orders for the first established item predicted to be received. In some cases, the number of items sold may be less than the predicted number by a threshold amount. In such a case, the computing device may initiate an impromptu sale to avoid spoilage of the unsold items.

At 738, the computing device may send, to a plurality of buyer devices, electronic communications indicting that a price of the first established item is reduced by a first amount. For example, the computing device may determine the plurality of buyer devices to which to send the electronic communications by receiving, from the courier device, an indicated geographic location of the courier device determined at least in part from a GPS receiver associated with the courier device. The computing device may then determine a plurality of past delivery locations within a threshold courier travel time of indicated geographic location of the courier device and determine a plurality of buyer devices associated with the plurality of past delivery locations as the plurality of buyer devices to which to send the electronic communications.

FIG. 8 is a flow diagram illustrating an example process 800 for an impromptu sale according to some implementations. In some examples, the process 800 may be executed at least in part by the service computing device 102, or other suitable computing device.

At 802, the computing device may receive, from a merchant device, an indication of availability of a quantity of an item having a threshold spoilage time until spoilage of the item. For instance, the merchant may have a surplus of the item that the merchant would like to sell quickly to avoid spoilage.

At 804, the computing device may determine, based at least in part on a plurality of past orders, a number of the item that is predicted to be ordered over a period of time shorter than the threshold spoilage time. For example, the computing device may determine sales of the same or similar items in the past from the past order information. In some cases, the computing device may already have an M/O value for the item.

At 806, the computing device may send, to at least one courier device, a recommended number of the items to pick up from a location associated with the merchant based at least in part on the number predicted to be sold. Based on the past order history, the computing device may determine the number of items to recommend for each courier to stock inventory.

At 808, the computing device may send, to a plurality of buyer devices, information about the selected item being available for delivery. As mentioned above, the computing device may send push notifications to buyers that have agreed to receive these. Further, the computing device may send item information about the item to any other buyers that open the buyer application at a delivery location within a threshold travel time of a courier stocking the item.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 9:
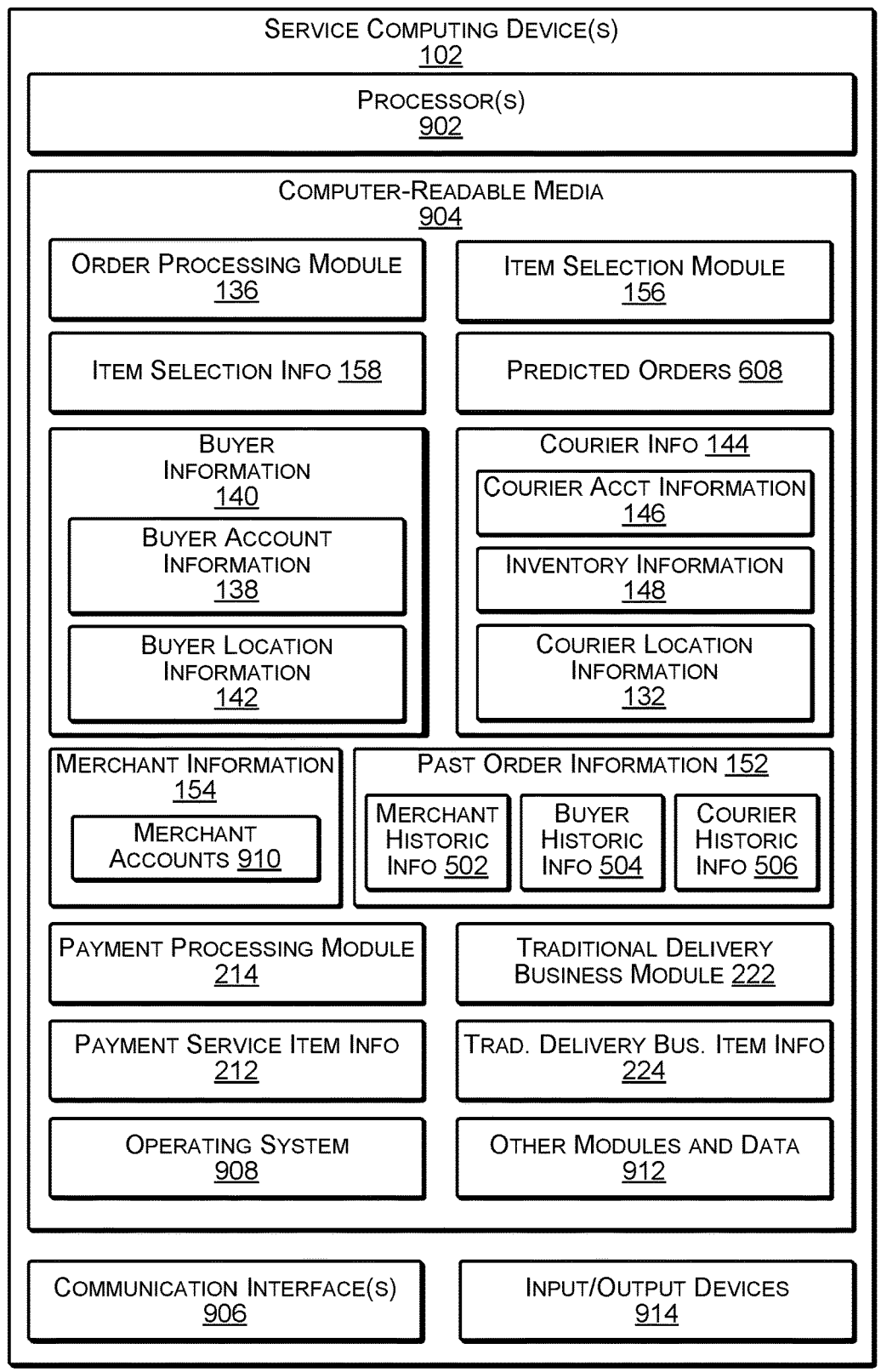
FIG. 9 illustrates select components of one or more example service computing devices according to some implementations.

FIG. 9 illustrates select components of the service computing device(s) 102 that may be used to implement some functionality of the services described herein. The service computing device 102 may include one or more servers or other types of computing devices that may be embodied in any number of ways. For instance, in the case of a server, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 102 may include one or more processors 902, one or more computer-readable media 904, and one or more communication interfaces 906. Each processor 902 may be a single processing unit or a number of processing units, and may include single or multiple computing units or multiple processing cores. The processor(s) 902 can be implemented as one or more microprocessors, microcomputers, microcontrollers, digital signal processors, central processing units, state machines, logic circuitries, and/or any devices that manipulate signals based on operational instructions. For instance, the processor(s) 902 may be one or more hardware processors and/or logic circuits of any suitable type specifically programmed or configured to execute the algorithms and processes described herein. The processor(s) 902 can be configured to fetch and execute computer-readable instructions stored in the computer-readable media 904, which can program the processor(s) 902 to perform the functions described herein.

The computer-readable media 904 may include volatile and nonvolatile memory and/or removable and non-removable media implemented in any type of technology for storage of information, such as computer-readable instructions, data structures, program modules, or other data. Such computer-readable media 904 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 904 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 904 may be used to store any number of functional components that are executable by the processors 902. In many implementations, these functional components comprise instructions or programs that are executable by the processors 902 and that, when executed, specifically configure the one or more processors 902 to perform the actions attributed above to the service computing device 102. Functional components stored in the computer-readable media 904 may include the order processing module 136 and the item selection module 156. Additional functional components stored in the computer-readable media 904 may include an operating system 908 for controlling and managing various functions of the service computing device 102. Further in some examples, the service computing device 102 or another service computing device may include the payment processing module 214 associated with a payment service and/or the traditional delivery business module 222 associated with a traditional delivery service.

In addition, the computer-readable media 904 may store data used for performing the operations described herein. Thus, the computer-readable media 904 may store: the buyer information 140, including buyer account information 138 and buyer location information 142; the courier information 144, including courier account information 146, inventory information 148, and courier location information 132; the merchant information 154, including merchant accounts 910; and the past order information 152, including the merchant historic information 502, the buyer historic information 504, and the courier historic information 506. In addition, the computer-readable media 904 may store the item selection information 158 used or generated by the item selection module 156 and the predicted orders 608, which may be determined by the item selection module 156. Additionally, the computer-readable media 904 may store the payment service item information 212 and/or the traditional delivery business item information 224. The service computing device 102 may also include or maintain other functional components and data not specifically shown in FIG. 9, such as other modules and data 912, which may include programs, drivers, etc., and the data used or generated by the functional components. Further, the service computing device 102 may include many other logical, programmatic and physical components, of which those described above are merely examples that are related to the discussion herein.

The communication interface(s) 906 may include one or more interfaces and hardware components for enabling communication with various other devices, such as over the network(s) 106. For example, communication interface(s) 906 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

The service computing device 102 may further be equipped with various input/output (I/O) devices 914. Such I/O devices 914 may include a display, various user interface controls (e.g., buttons, joystick, keyboard, mouse, touch screen, etc.), audio speakers, connection ports and so forth.

Figure 10:
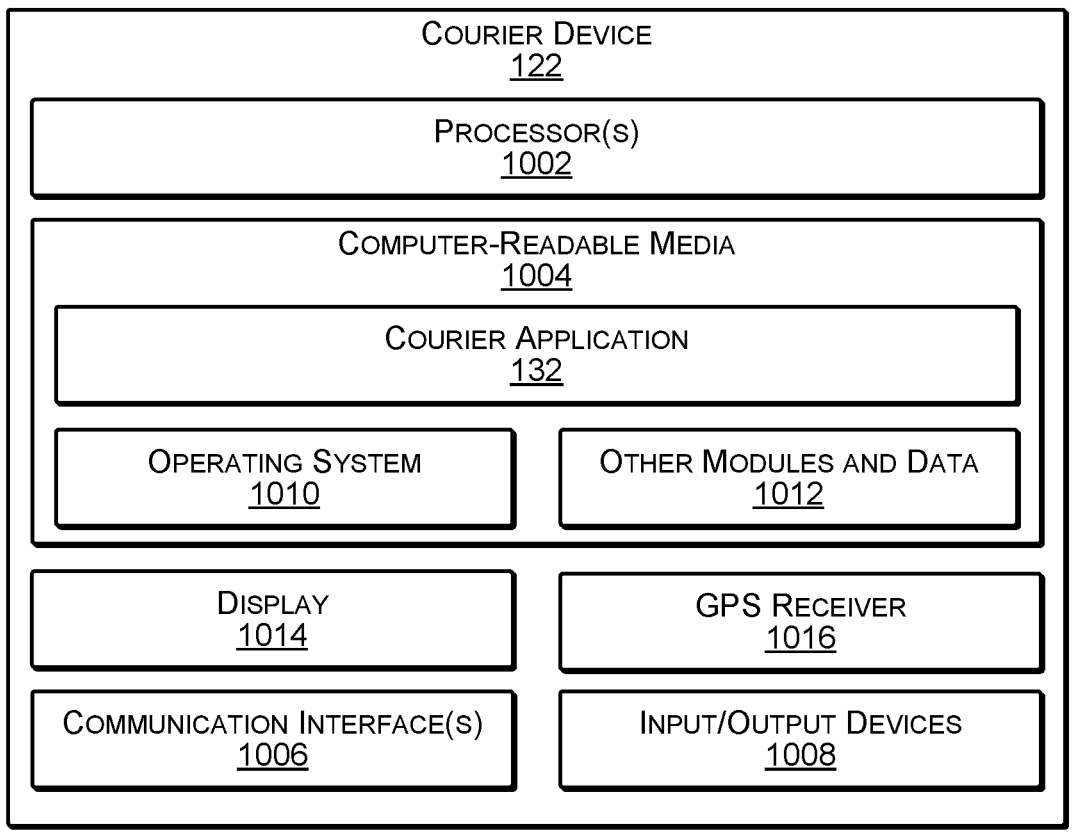
FIG. 10 illustrates select components of an example courier device according to some implementations.

FIG. 10 illustrates select example components of the courier device 122 that may implement the functionality described above according to some examples. The courier device 122 may be any of a number of different types of portable computing devices. Some examples of the courier device 122 may include smart phones and mobile communication devices; tablet computing devices; laptops, netbooks and other portable computers; wearable computing devices and/or body-mounted computing devices, which may include watches; augmented reality devices, such as helmets, goggles or glasses; and any other portable device capable of sending communications and performing the functions according to the techniques described herein.

In the example of FIG. 10, the courier device 122 includes components such as at least one processor 1002, one or more computer-readable media 1004, one or more communication interfaces 1006, and one or more input/output (I/O) devices 1008. Each processor 1002 may itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some cases, the processor 1002 may be one or more hardware processors and/or logic circuits of any suitable type specifically programmed or configured to execute the algorithms and processes described herein. The processor 1002 can be configured to fetch and execute computer-readable processor-executable instructions stored in the computer-readable media 1004.

Depending on the configuration of the courier device 122, the computer-readable media 1004 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 1004 may include, but is not limited to, RAM, ROM, EEPROM, flash memory, solid-state storage, magnetic disk storage, optical storage, and/or other computer-readable media technology. Further, in some cases, the courier device 122 may access external storage, such as RAID storage systems, storage arrays, network attached storage, storage area networks, cloud storage, or any other medium that can be used to store information and that can be accessed by the processor 1002 directly or through another computing device or network. Accordingly, the computer-readable media 1004 may be computer storage media able to store instructions, modules, or components that may be executed by the processor 1002. Further, when mentioned herein, non-transitory computer-readable media exclude media such as energy, carrier signals, electromagnetic waves, and signals per se.

The computer-readable media 1004 may be used to store and maintain any number of functional components that are executable by the processor 1002. In some implementations, these functional components comprise instructions or programs that are executable by the processor 1002 and that, when executed, implement operational logic for performing the actions and services attributed above to the courier device 122. Functional components of the courier device 122 stored in the computer-readable media 1004 may include the courier application 132, as discussed above, which may present the courier with one or more GUIs for performing the courier tasks. Additional functional components may include an operating system 1010 for controlling and managing various functions of the courier device 122 and for enabling basic user interactions with the courier device 122.

In addition, the computer-readable media 1004 may also store data, data structures and the like, that are used by the functional components. Depending on the type of the courier device 122, the computer-readable media 1004 may also optionally include other functional components and data, such as other modules and data 1012, which may include applications, programs, drivers, etc., and the data used or generated by the functional components. Further, the courier device 122 may include many other logical, programmatic, and physical components, of which those described are merely examples that are related to the discussion herein.

The communication interface(s) 1006 may include one or more interfaces and hardware components for enabling communication with various other devices, such as over the network(s) 106 or directly. For example, communication interface(s) 1006 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 10 further illustrates that the courier device 122 may include a display 1014, which may be any suitable type of electronic display device for visually presenting information, GUIs, or the like. Alternatively, in some examples, the courier device 122 may not include a display.

The courier device 122 may further include the one or more I/O devices 1008. The I/O devices 1008 may include speakers, a microphone, a camera, and various user controls (e.g., buttons, a joystick, a keyboard, a keypad, etc.), a haptic output device, and so forth. Other components included in the courier device 122 may include various types of sensors, which may include a GPS receiver 1016 able to receive and indicate location information, as well as other sensors (not shown) such as an accelerometer, gyroscope, compass, proximity sensor, and the like. In some cases, the GPS receiver 1016 may be used by the courier application 132 to determine a current geographic location of the courier device 122. Additionally, or alternatively, the communication interfaces 1006 may be used to determine the current location of the courier device 122, such as based on communication with nearby cell towers, wireless access points, and the like. In some examples, the courier application 132 may send this location information periodically to the service computing device as an indicated location of the associated courier. Additionally, or alternatively, the courier application 132 may send the location information whenever the accelerometer indicates a change in acceleration, e.g., beyond threshold amount, which may indicate starting movement or stopping movement by the courier. Furthermore, the courier device 122 may include various other components that are not shown, examples of which include removable storage, a power source, such as a battery and power control unit, and so forth.

Figure 11:
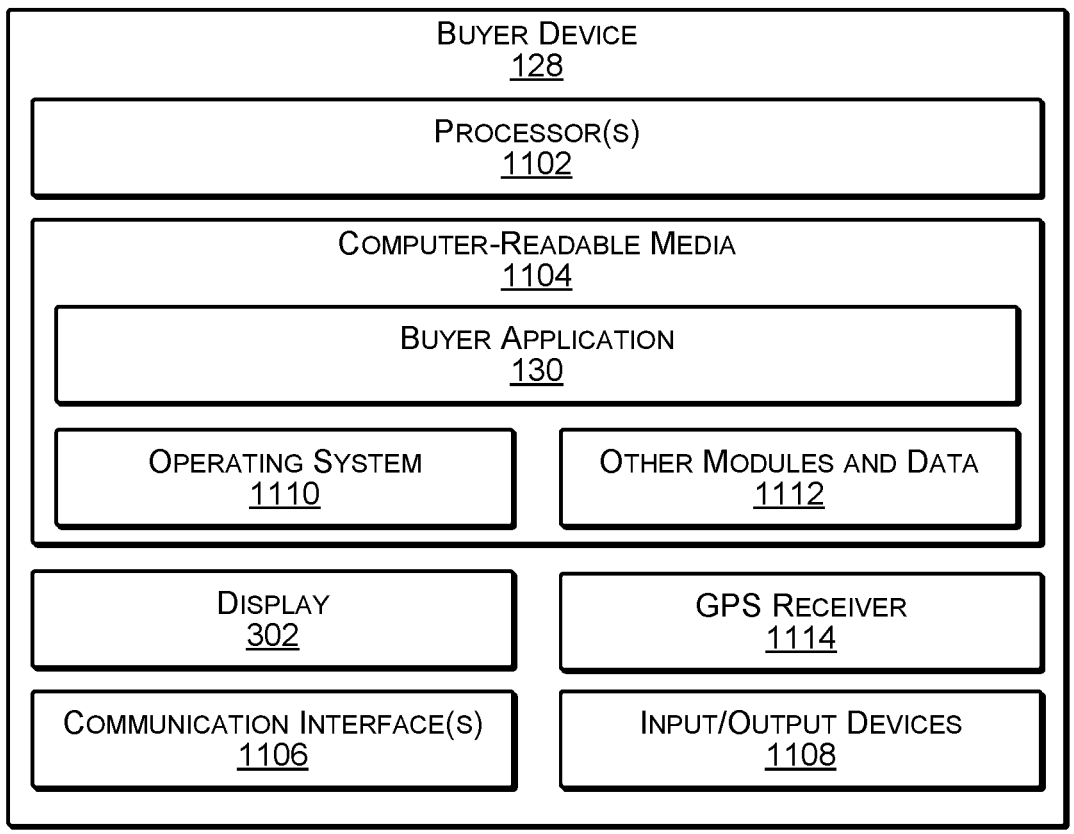
FIG. 11 illustrates select components of an example buyer device according to some implementations.

FIG. 11 illustrates select example components of the buyer device 128 that may implement the functionality described above according to some examples. The buyer device 128 may be any of a number of different types of portable computing devices or semi-portable computing devices. Some examples of the buyer device 128 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein. Further, in some examples, the buyer device 128 may be a stationary or semi-stationary computing device, such as a desktop computer or other device with computing capabilities.

In the example of FIG. 11, the buyer device 128 includes components such as at least one processor 1102, one or more computer-readable media 1104, one or more communication interfaces 1106, and one or more input/output (I/O) devices 1108. Each processor 1102 may itself comprise one or more processors or processing cores. For example, the processor 1102 can be implemented as one or more microprocessors, microcomputers, microcontrollers, digital signal processors, central processing units, state machines, logic circuitries, and/or any devices that manipulate signals based on operational instructions. In some cases, the processor 1102 may be one or more hardware processors and/or logic circuits of any suitable type specifically programmed or configured to execute the algorithms and processes described herein. The processor 1102 can be configured to fetch and execute computer-readable processor-executable instructions stored in the computer-readable media 1104.

Depending on the configuration of the buyer device 128, the computer-readable media 1104 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 1104 may include, but is not limited to, RAM, ROM, EEPROM, flash memory, solid-state storage, magnetic disk storage, optical storage, and/or other computer-readable media technology. Further, in some cases, the buyer device 128 may access external storage, such as RAID storage systems, storage arrays, network attached storage, storage area networks, cloud storage, or any other medium that can be used to store information and that can be accessed by the processor 1102 directly or through another computing device or network. Accordingly, the computer-readable media 1104 may be computer storage media able to store instructions, modules, or components that may be executed by the processor 1102. Further, when mentioned, non-transitory computer-readable media exclude media such as energy, carrier signals, electromagnetic waves, and signals per se.

The computer-readable media 1104 may be used to store and maintain any number of functional components that are executable by the processor 1102. In some implementations, these functional components comprise instructions or programs that are executable by the processor 1102 and that, when executed, implement operational logic for performing the actions and services attributed above to the buyer device 128. Functional components of the buyer device 128 stored in the computer-readable media 1104 may include the buyer application 130, as discussed above, which may present the buyer with one or more GUIs for placing an order, some examples of which are described above. Additional functional components may include an operating system 1110 for controlling and managing various functions of the buyer device 128 and for enabling basic user interactions with the buyer device 128.

In addition, the computer-readable media 1104 may also store data, data structures and the like, that are used by the functional components. Depending on the type of the buyer device 128, the computer-readable media 1104 may also optionally include other functional components and data, such as other modules and data 1112, which may include applications, programs, drivers, etc., and the data used or generated by the functional components. Further, the buyer device 128 may include many other logical, programmatic, and physical components, of which those described are merely examples that are related to the discussion herein.

The communication interface(s) 1106 may include one or more interfaces and hardware components for enabling communication with various other devices, such as over the network(s) 106 or directly. For example, communication interface(s) 1106 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 11 further illustrates that the buyer device 128 may include the display 302. Depending on the type of computing device used as the buyer device 128, the display 302 may employ any suitable display technology. Alternatively, in some examples, the buyer device 128 may not include a display.

The buyer device 128 may further include the one or more I/O devices 1108. The I/O devices 1108 may include speakers, a microphone, a camera, and various user controls (e.g., buttons, a joystick, a keyboard, a keypad, etc.), a haptic output device, and so forth. Other components included in the buyer device 128 may include various types of sensors, which may include a GPS receiver 1114 able to indicate location information, as well as other sensors (not shown) such as an accelerometer, gyroscope, compass, proximity sensor, and the like. In some cases, the GPS receiver 1114 may be used by the buyer application 130 to determine a current geographic location of the buyer device 128. Additionally, or alternatively, the communication interfaces 1106 may be used to determine the current location of the buyer device 128, such as based on communication with nearby cell towers, wireless access points, and the like. In some examples, the buyer application 130 may send this location information to the service computing device as an indicated delivery location for the associated buyer. Additionally, the buyer device 128 may include various other components that are not shown, examples of which include removable storage, a power source, such as a battery and power control unit, and so forth. The merchant devices 208 and 614 may have hardware configurations similar to the buyer device, but with different functional components, such as the merchant application 210 discussed above that may include capability for processing and tracking point-of-sale payments, merchant inventory, and the like.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
   determining, by one or more processors, a predicted amount of an item predicted to be ordered over a first period of time;
   sending, by the one or more processors, to a courier device associated with a courier, a communication for picking up a quantity of the item based at least in part on the predicted amount;
   receiving, by the one or more processors, from the courier device, an indicated geographic location of the courier device determined at least in part from a satellite positioning system receiver associated with the courier device;
   determining, by the one or more processors, an amount of the item possessed by the courier;
   determining, by the one or more processors, a plurality of past delivery locations within a threshold courier travel time of the indicated geographic location of the courier device;
   determining, by the one or more processors, a plurality of buyer devices associated with the plurality of past delivery locations; and
   sending, by the one or more processors, to the plurality of buyer devices, respective electronic communications indicating that the item is available for delivery from the courier located within the threshold courier travel time of a respective buyer location.

2. The method as recited in claim 1, further comprising determining the predicted amount of the item predicted to be ordered based at least in part on determining a number of the items ordered during a same time period on a same day of a past week.

3. The method as recited in claim 1, further comprising:
   determining, based at least in part on the plurality of past delivery locations, a cluster of buyer locations associated with the plurality of past delivery locations; and
   sending, to the courier device, an indication of a recommended waiting location based at least in part on the cluster.

4. The method as recited in claim 1, further comprising:
   ranking, based at least in part on past order information, a plurality of items including the item ordered within a geographic region, wherein the ranking is based at least in part on a quantity of each item ordered of the plurality of items; and
   selecting the item for the courier based at least in part on the item being ranked higher than a threshold ranking.

5. The method as recited in claim 4, further comprising selecting the item based at least in part on determining that a spoilage time associated with the item exceeds a threshold spoilage time.

6. The method as recited in claim 1, further comprising:
   determining that a number of the item ordered by buyers over a second period of time is less than the predicted number by another threshold amount; and
   sending, to the plurality of buyer devices, respective electronic communications indicating that the price of the item is additionally reduced.

7. A system comprising:
   one or more processors configured by executable instructions to perform operations that include:
   receiving, by the one or more processors, from a courier device, an indicated geographic location of the courier device determined at least in part from a satellite positioning system receiver associated with the courier device;
   determining, by the one or more processors, an amount of an item possessed by the courier;
   determining, by the one or more processors, a plurality of past delivery locations within a threshold courier travel time of the indicated geographic location of the courier device;
   determining, by the one or more processors, a plurality of buyer devices associated with the plurality of past delivery locations; and
   sending, by the one or more processors, to the plurality of buyer devices, respective electronic communications indicating that the item is available for delivery from the courier located within the threshold courier travel time of a respective buyer location.

8. The system as recited in claim 7, the operations further comprising:
   determining a predicted amount of the item predicted to be ordered over a first period of time; and
   sending, to a courier device associated with a courier, a communication for picking up a quantity of the item based at least in part on the predicted amount.

9. The system as recited in claim 8, the operations further comprising determining the predicted amount of the item predicted to be ordered based at least in part on determining a number of the items ordered during a same time period on a same day of a past week.

10. The system as recited in claim 7, the operations further comprising:
    determining, based at least in part on the plurality of past delivery locations, a cluster of buyer locations associated with the plurality of past delivery locations; and
    sending, to the courier device, an indication of a recommended waiting location based at least in part on the cluster.

11. The system as recited in claim 7, the operations further comprising:
    ranking, based at least in part on past order information, a plurality of items including the item ordered within a geographic region, wherein the ranking is based at least in part on a quantity of each item ordered of the plurality of items; and
    selecting the item for the courier based at least in part on the item being ranked higher than a threshold ranking.

12. The system as recited in claim 11, the operations further comprising selecting the item based at least in part on determining that a spoilage time associated with the item exceeds a threshold spoilage time.

13. The system as recited in claim 7, the operations further comprising:
    determining that a number of the item ordered by buyers over a second period of time is less than the predicted number by another threshold amount; and
    sending, to the plurality of buyer devices, respective electronic communications-indicating that the price of the item is additionally reduced.

14. One or more non-transitory computer-readable media storing instructions that, when executed by one or more processors, program the one or more processors to perform operations comprising:

receiving, from a courier device, an indicated geographic location of a courier device determined at least in part from a satellite positioning system associated with the courier device;

determining an amount of an item possessed by the courier;

determining a plurality of past delivery locations within a threshold courier travel time of the indicated geographic location of the courier device;

determining a plurality of buyer devices associated with the plurality of past delivery locations; and sending, to the plurality of buyer devices, respective electronic communications indicating that the item is available for delivery from the courier located within the threshold courier travel time of a respective buyer location.

15. The one or more non-transitory computer-readable media as recited in claim 14, the operations further comprising:

determining a predicted amount of the item predicted to be ordered over a first period of time; and sending, to a courier device associated with a courier, a communication for picking up a quantity of the item based at least in part on the predicted amount.

16. The one or more non-transitory computer-readable media as recited in claim 15, the operations further comprising determining the predicted amount of the item predicted to be ordered based at least in part on determining a number of the items ordered during a same time period on a same day of a past week.

17. The one or more non-transitory computer-readable media as recited in claim 14, the operations further comprising:

determining, based at least in part on the plurality of past delivery locations, a cluster of buyer locations associated with the plurality of past delivery locations; and sending, to the courier device, an indication of a recommended waiting location based at least in part on the cluster.

18. The one or more non-transitory computer-readable media as recited in claim 14, the operations further comprising:

ranking, based at least in part on past order information, a plurality of items including the item ordered within a geographic region, wherein the ranking is based at least in part on a quantity of each item ordered of the plurality of items; and selecting the item for the courier based at least in part on the item being ranked higher than a threshold ranking.

19. The one or more non-transitory computer-readable media as recited in claim 18, the operations further comprising selecting the item based at least in part on determining that a spoilage time associated with the item exceeds a threshold spoilage time.

20. The one or more non-transitory computer-readable media as recited in claim 14, the operations further comprising:

determining that a number of the items ordered by buyers over a second period of time is less than the predicted number by another threshold amount; and sending, to the plurality of buyer devices, respective electronic communications indicating that the price of the item is additionally reduced.

* * * * *